US008845924B2

(12) United States Patent
Adachi et al.

(10) Patent No.: US 8,845,924 B2
(45) Date of Patent: Sep. 30, 2014

(54) WATER ABSORBING AGENT AND PRODUCTION METHOD THEREOF

(75) Inventors: Yoshifumi Adachi, Hyogo (JP); Kazushi Torii, Hyogo (JP); Yusuke Watanabe, Hyogo (JP); Taishi Kobayashi, Hyogo (JP); Toshimasa Kitayama, Hyogo (JP); Seiichi Suzuki, Kanagawa (JP); Atsuro Yoneda, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 929 days.

(21) Appl. No.: 12/678,006

(22) PCT Filed: Sep. 26, 2008

(86) PCT No.: PCT/JP2008/067990
§ 371 (c)(1),
(2), (4) Date: Mar. 12, 2010

(87) PCT Pub. No.: WO2009/041727
PCT Pub. Date: Apr. 2, 2009

(65) Prior Publication Data
US 2011/0180755 A1    Jul. 28, 2011

(30) Foreign Application Priority Data

Sep. 28, 2007  (JP) ................................. 2007-256636
Dec. 3, 2007   (JP) ................................. 2007-312775

(51) Int. Cl.
| | | |
|---|---|---|
| *C09K 3/00* | (2006.01) | |
| *C08F 120/06* | (2006.01) | |
| *C08G 73/02* | (2006.01) | |
| *C08L 33/02* | (2006.01) | |
| *C08F 8/32* | (2006.01) | |
| *C08L 79/02* | (2006.01) | |
| *C08F 220/06* | (2006.01) | |
| *C08K 5/09* | (2006.01) | |
| *C08F 222/10* | (2006.01) | |

(52) U.S. Cl.
CPC . *C08F 8/32* (2013.01); *C08G 73/02* (2013.01); *C08L 33/02* (2013.01); *C08L 79/02* (2013.01); *C08F 222/1006* (2013.01); *C08F 220/06* (2013.01); *C08K 5/09* (2013.01)
USPC .......................................... 252/194; 525/176

(58) Field of Classification Search
USPC ....................................................... 252/194
See application file for complete search history.

(56) References Cited

U.S. PATENT DOCUMENTS

| | | | |
|---|---|---|---|
| 5,382,610 | A | 1/1995 | Harada et al. |
| 5,797,893 | A | 8/1998 | Wada et al. |
| 5,843,575 | A | 12/1998 | Wang et al. |
| 5,849,405 | A | 12/1998 | Wang et al. |
| 5,851,672 | A | 12/1998 | Wang et al. |
| 5,858,535 | A | 1/1999 | Wang et al. |
| 6,099,950 | A | 8/2000 | Wang et al. |
| 2002/0128618 | A1 | 9/2002 | Frenz et al. |
| 2003/0069359 | A1 | 4/2003 | Torii et al. |
| 2004/0071966 | A1 | 4/2004 | Inger et al. |
| 2005/0013992 | A1* | 1/2005 | Azad et al. ..................... 428/327 |
| 2005/0020780 | A1 | 1/2005 | Inger et al. |
| 2005/0245684 | A1 | 11/2005 | Daniel et al. |
| 2006/0183828 | A1 | 8/2006 | Dairoku et al. |
| 2006/0229413 | A1 | 10/2006 | Torii et al. |

FOREIGN PATENT DOCUMENTS

| | | |
|---|---|---|
| JP | 2000-095955 | 4/2000 |
| JP | 2002-212301 | 7/2002 |
| WO | 99/34841 | 7/1999 |
| WO | 2004/069915 | 8/2004 |

OTHER PUBLICATIONS

Chinese Office Action dated Nov. 9, 2011 in Chinese Patent Application No. 200880109003.1, and English translation.
Ion Koukan Jushi • Gousei Kyuuchakuzai Manyuaru I Kiso-Hen (Manual I, Basic Series of Ion-Exchange Resin and Synthetic Absorbent), Jun. 1, 1992, pp. 37 to 39, and partial English translation.
Japanese Office Action dated Oct. 15, 2013 in Japanese Patent Application No. 2010-501726, and English translation.

\* cited by examiner

*Primary Examiner* — Peter F Godenschwager
(74) *Attorney, Agent, or Firm* — Roylance, Abrams, Berdo & Goodman, L.L.P.

(57) ABSTRACT

The present invention provides a water absorbing agent, including: water absorbent resin particles; and a modified cationic polymer compound containing a primary amino group and/or a secondary amino group, the modified cationic polymer compound being obtained by reacting, with a modifying agent, a cationic polymer compound containing the primary amino group and/or the secondary amino group, and the modifying agent containing two or more carbon atoms continuously linked, and one reactive group which reacts with the primary amino group and/or the secondary amino group. The present invention further provides a method for producing a water absorbing agent including water absorbent resin particles, the method including the step (i) of mixing the water absorbent resin particles with a modified cationic polymer compound.

4 Claims, 1 Drawing Sheet

WATER ABSORBING AGENT AND PRODUCTION METHOD THEREOF

TECHNICAL FIELD

The present invention relates to a water absorbing agent and a method of producing the same, particularly, a water absorbing agent that is suitable for use in a sanitary material such as a disposable diaper, a sanitary napkin, and an incontinence pad, for example, and a method of producing the water absorbing agent.

BACKGROUND ART

Conventionally, a water absorbing material made of a hydrophilic fiber such as pulp, and a water absorbing agent has been in widespread use in sanitary materials such as a disposable diaper, a sanitary napkin, and an incontinence pad, for the purpose of absorbing body fluids.

For enhancement in convenience, it has been demanded to make these sanitary materials thinner in recent years. This results in that, in a water absorbing material, a ratio of the hydrophilic fiber having low bulk specific gravity is decreased, and a ratio of the water absorbing agent having a high water absorbing rate and high bulk specific gravity is increased. Water absorbing agent usage in the water absorbing material is thus increased so as to make the sanitary material thinner without a reduction in its properties such as a water absorption amount.

Such a sanitary material having a small ratio of the hydrophilic fiber and a large ratio of the water absorbing agent is preferable for merely keeping liquid. However, when actually used in a disposable diaper, for example, such a sanitary material has a problem in distribution and diffusion of the liquid. For example, a large amount of the water absorbing agent turns into a soft gel state when absorbing water, and causes a gel blocking phenomenon in which water is prevented from being absorbed deeper into the water absorbing agent. This dramatically decreases a diffusing property of the liquid in the sanitary material. The ratio of the hydrophilic fiber to the water absorbing agent is inevitably limited so as to both avoid such a problem and maintain absorption characteristics of the water absorbing body. It follows that the sanitary material cannot be thinner than a certain limit.

In order to both suppress the gel blocking and realize a sufficient absorption amount, it is necessary to obtain a water absorbing agent that is excellent in a balance between an absorption capacity represented by a centrifugal retention capacity (CRC), for example, and liquid permeability represented by a saline flow conductivity (SFC), for example. However, they have such a relationship that an increase in one results in a decrease in the other. This makes it difficult to improve the relationship (balance) between them to a successful level. As means for attaining such an object, the following techniques have been known, for example.

Patent Document 1 discloses a water absorbent resin that has been processed with a tri- or more-valent cation. Patent Document 2 discloses a technique with which an electrostatic or stereoscopic spacer is used with a water absorbent resin. Patent Document 3 discloses a particulate water absorbing agent containing: water absorbent resin particles produced by (i) cross-linking a monomer containing acrylic acid and/or salt thereof, and (ii) further cross-linking a surface of each of particles thus obtained, which particles have been pulverized into irregular shapes; and an agent for enhancing liquid permeability. An object of Patent Document 3 is to provide a water absorbing agent having properties of both capillary suction pressure and liquid permeability.

Meanwhile, other than Patent Documents 1 through 3 whose object is to improve the balance between the absorption capacity and the liquid permeability, there has been proposed to mix various additives for the purpose of an improvement in various properties of a water absorbent resin.

For example, Patent Document 4 discloses a method of producing a water absorbing agent, including: the steps of: processing surface of water absorbent resin particles with a cross-linking agent, the water absorbent resin particles having a carboxyl group and the cross-linking agent having two or more functional groups that can form a covalent bond by reacting with the carboxyl group, so as to crosslink a part of the carboxyl group; and then mixing the particles with a cationic polymer compound having a weight-average molecular weight of 2000 or more, which cationic polymer compound can form an ion bond by reacting with the carboxyl group. Thereby, Patent Document 4 easily obtains a water absorbing agent that hardly moves or is omitted in complex with a cellulose fiber, which water absorbing agent has such a feature so as to be expected to have a synergetic effect in absorption performance.

Further, Patent Document 5 discloses a water absorbing agent composition containing water-insoluble inorganic powder fine particles and/or a polyamine compound having a weight-average molecular weight of 5000 or more, wherein: under a load of 20 g/cm$^2$ (1.96 kPa), 0.9 weight % sodium chloride solution has a diffusing absorption capacity of 25 g/g or more after a lapse of 60 minutes from the beginning of absorption.

Furthermore, Patent Document 6 discloses a water absorbing agent composition containing: water absorbent resin particles having at least an anionic dissociable group; and water-swelling resin particles having a cationic group. Thereby, Patent Document 6 provides a water absorbing agent composition that is more excellent in an absorption speed, a permeability rate of a gel layer, a permeability rate of a gel layer under pressure, and an absorption capacity against pressure respectively, than each of the two kinds of the resin particles solely used.

Patent Document 7 discloses water absorbent resin particles, wherein: at least a part of a surface of the water absorbent resin particles is coated with a coating film that is made from an adduct of a polyvalent amine compound and a compound having an olefinic double bond. Thereby, Patent Document 7 provides: a water absorbing agent that is advantageous in an absorption capacity under pressure or no pressure, provides high safety for a human skin and the like, and is suitable for use in a sanitary material; and a method of producing the water absorbing agent.

Further, Patent Document 8 discloses a mixture of water absorbent resin particles and a cationic polymer compound in which a specific region is crosslinked. Thereby, Patent Document 8 realizes that, even long after a swelling, it is possible to (i) keep a state where gels clump together and retain a shape, and (ii) have high liquid permeability and a high absorption capacity against pressure.

Patent Document 9 discloses a water absorbing agent made from a nitrogen-containing polymer having a nitrogen atom that can realize a protonation of 5 to 17 mole/kg against a total mass of particles of a water absorbing agent polymer, and the nitrogen-containing polymer. Thereby, Patent Document 9 provides a water absorbing agent having: an improved property of high absorption performance; improved liquid permeability; and high water resistance.

Patent Document 10 discloses a water absorbent resin produced by compounding an acid crosslinked polymer and a basic crosslinked polymer. In Patent Document 10, a crosslinked polyethylenimine, and a crosslinked polyallylamine are employed as the basic crosslinked polymer.

PATENT DOCUMENT 1

Pamphlet of International Publication WO2001/74913 (published on Oct. 11, 2001)

PATENT DOCUMENT 2

Specification of US Patent Application Publication No. 2002/0128618 (published on Sep. 12, 2002

PATENT DOCUMENT 3

Pamphlet of International Publication WO2004/069915 (published on Aug. 19, 2004)

PATENT DOCUMENT 4

Japanese Unexamined Patent Publication, Tokukaihei 5-31362 (published on Feb. 9, 1993)

PATENT DOCUMENT 5

Japanese Unexamined Patent Publication, Tokukai 2000-342963 (published on Dec. 12, 2000)

PATENT DOCUMENT 6

Japanese Unexamined Patent Publication, Tokukai 2000-95955 (published on Apr. 4, 2000)

PATENT DOCUMENT 7

Japanese Unexamined Patent Publication, Tokukai 2002-212301 (published on Jul. 31, 2002)

PATENT DOCUMENT 8

Japanese Unexamined Patent Publication Tokukai 2003-62460 (published on Mar. 4, 2003)

PATENT DOCUMENT 9

Japanese translation of PCT International Publication, Tokuhyo 2005-537131 (published on Dec. 8, 2005)

PATENT DOCUMENT 10

Pamphlet of International Publication WO01999/34841 (published on Jul. 15, 1999)

DISCLOSURE OF INVENTION

Problem to be Solved by the Invention

The techniques disclosed in Patent Documents 1 through 3 are techniques for accomplishing an improvement in the balance between the absorption capacity and the liquid permeability by adding an additive having an effect of increasing the liquid permeability, such as polyvalent metal salt (metal cation), inorganic particles, or a polycation to a water absorbent resin. However, the relationship (balance) has still not reached a sufficient level, and much improvement has been demanded. Further, the techniques disclosed in Patent Documents 4 through 10 have not taken the relationship (balance) between the absorption capacity and the liquid permeability to the sufficient level.

Specifically, it is demanded for the water absorbing agent to have both a centrifugal retention capacity (CRC) and a saline flow conductivity (SFC) when the water absorbing agent is actually used. However, the conventional techniques have not successfully satisfied these properties.

The present invention is made in view of the problem. An object of the present invention is to provide: a water absorbing agent that is excellent in a balance between the centrifugal retention capacity (CRC) and the saline flow conductivity (SFC); and a method of producing the water absorbing agent.

Means to Solve the Problems

The inventors of the present invention diligently studied the foregoing problems. As a result, the inventors of the present invention firstly found out that a dramatically more excellent balance between a centrifugal retention capacity (CRC) and a saline flow conductivity (SFC) than conventional water absorbing agents can be attained in a water absorbing agent containing water absorbent resin particles; and a modified cationic polymer compound containing a primary amino group and/or a secondary amino group, the modified cationic polymer compound is obtained by modifying, with a modifying agent, a cationic polymer compound containing a primary amino group and/or a secondary amino group, in other words, the modified cationic polymer compound being obtained by reacting, with a modifying agent, a cationic polymer compound containing the primary amino group and/or the secondary amino group, and the modifying agent containing two or more carbon atoms continuously linked, and one reactive group which reacts with the primary amino group and/or the secondary amino group. Based on the finding, the inventors of the present invention accomplished the present invention. More specifically, the inventors of the present invention firstly found out that a dramatically more excellent balance between balance between a centrifugal retention capacity (CRC) and a saline flow conductivity (SFC) than conventional water absorbing agents can be attained in a water absorbing agent in which a modified cationic polymer compound containing a primary amino group and/or a secondary amino group exists on a surface of each of the water absorbent resin particles, and the modified cationic polymer compound is obtained by reacting, with a modifying agent, a cationic polymer compound containing the primary amino group and/or the secondary amino group, and the modifying agent contains two or more adjacent carbon atoms and one reactive group which reacts with the primary amino group and/or the secondary amino group. Based on this finding, the inventors of the present invention accomplished the present invention.

Furthermore, the inventors of the present invention firstly found out that a dramatically more excellent balance between balance between a centrifugal retention capacity (CRC) and a saline flow conductivity (SFC) than conventional water absorbing agents can be attained in a water absorbing agent containing: water absorbent resin particles; and a cationic polymer compound containing a secondary amino group, the cationic polymer compound having a cationic value of from 1 to 22 mmol/g, and a secondary cationic value of from 0.1 to 11 mmol/g. Based on this finding, the inventors of the present invention accomplished the present invention.

In order to solve the foregoing problems, a water absorbing agent according to the present invention is a water absorbing agent, comprising: water absorbent resin particles; and a modified cationic polymer compound containing a primary amino group and/or a secondary amino group, the modified cationic polymer compound being obtained by reacting, with a modifying agent, a cationic polymer compound containing the primary amino group and/or the secondary amino group, and the modifying agent containing two or more carbon atoms continuously linked, and one reactive group which reacts with the primary amino group and/or the secondary amino group.

With the arrangement, it is possible to provide a water absorbing agent which is excellent in a balance between a centrifugal retention capacity (CRC) and a saline flow conductivity (SFC).

It is preferable to arrange the water absorbing agent according to the present invention so that the modified cationic polymer compound exists on a surface of each of the water absorbent resin particles.

It is preferable to arrange the water absorbing agent according to the present invention so that a weight average molecular weight of the cationic polymer compound is 5000 or more.

With the arrangement, it is possible to provide a water absorbing agent which is excellent in a balance between a centrifugal retention capacity (CRC) and a saline flow conductivity (SFC).

It is preferable to arrange the water absorbing agent according to the present invention so that a bond formed by the reaction between the modifying agent and the cationic polymer compound having the primary amino group and/or the secondary amino group is not an amidic bond. With this arrangement, it is possible to more effectively enhance liquid permeability.

It is preferable to arrange the water absorbing agent according to the present invention so that the modifying agent contains three or more carbon atoms continuously linked. With the arrangement, it is possible to more effectively enhance liquid permeability.

It is preferable to arrange the water absorbing agent according to the present invention so that a ratio of the primary amino group and/or secondary amino group reacting with the modifying agent relative to entire nitrogen atoms of the cationic polymer compound ranges from 5 to 90 mol %. With the arrangement, it is possible to more effectively enhance liquid permeability.

It is preferable to arrange the water absorbing agent according to the present invention so that a cationic value of the modified cationic polymer compound ranges from 1 to 23 mmol/g. With the arrangement, the resultant water absorbing agent is still more excellent in a balance between CRC and SFC.

In order to attain the object, a water absorbing agent according to the present invention may be a water absorbing agent comprising: water absorbent resin particles; and a cationic polymer compound containing a secondary amino group, the cationic polymer compound having a cationic value of from 1 to 22 mmol/g, and a secondary cationic value of from 0.1 to 11 mmol/g.

With the arrangement, it is possible to provide a water absorbing agent which is excellent in a balance between a centrifugal retention capacity (CRC) and a saline flow conductivity (SFC).

It is preferable to arrange the water absorbing agent according to the present invention so that the cationic polymer compound containing a secondary amino group exists on a surface of each of the water absorbent resin particles.

It is preferable to arrange the water absorbing agent according to the present invention so that a weight average molecular weight of the cationic polymer compound containing a secondary amino group is 5000 or more.

With the arrangement, it is possible to provide a water absorbing agent which is excellent in a balance between a centrifugal retention capacity (CRC) and a saline flow conductivity (SFC).

It is preferable to arrange the water absorbing agent according to the present invention so that the surface of the water absorbent resin particle is crosslinked.

With the arrangement, it is possible to reduce re-wet in exerting a pressure onto a swollen water absorbing agent. Thus, it is possible to enhance AAP, i.e., an absorbency against pressure.

It is preferable to arrange the water absorbing agent according to the present invention so that a contact angle of a droplet in dropping 0.9 mass % sodium chloride aqueous solution is 90° or less. With the arrangement, the resultant water absorbing agent has high hydrophilicity which results in excellent liquid diffusibility in being used in an absorbent core. Therefore, liquid is absorbed by a larger area of the absorbent core, so that also properties of the absorbent core are improved.

It is preferable to arrange the water absorbing agent according to the present invention so as to further include a water-soluble polyvalent metal salt. With the arrangement, it is possible to further enhance a centrifugal retention capacity (CRC) and a saline flow conductivity (SFC) of the water absorbing agent.

It is preferable to arrange the water absorbing agent according to the present invention so as to further include water-insoluble inorganic fine particles. With the arrangement, it is possible to further enhance a centrifugal retention capacity (CRC) and a saline flow conductivity (SFC) of the water absorbing agent. Further, a handling property (fluidity) of the powder is improved and the powder is hardly clumped at the time of moisture absorption.

In order to solve the foregoing problems, a method according to the present invention for producing a water absorbing agent is a method for producing a water absorbing agent including water absorbent resin particles, the method comprising the step (i) of mixing the water absorbent resin particles with a modified cationic polymer compound, the modified cationic polymer compound being obtained by reacting, with a modifying agent, a cationic polymer compound containing a primary amino group and/or a secondary amino group, and the modifying agent containing two or more carbon atoms continuously linked and one reactive group which reacts with the primary amino group and/or the secondary amino group.

With the arrangement, it is possible to provide a water absorbing agent which is excellent in a balance between a centrifugal retention capacity (CRC) and a saline flow conductivity (SFC).

It is preferable to arrange the method according to the present invention for producing a water absorbing agent such that a solution, an emulsification solution, or a suspension solution of the modified cationic polymer compound is mixed with the water absorbent resin particles. With the arrangement, it is possible to evenly mix the water absorbent resin particles with the modified cationic polymer compound. This results in further improvement of the balance between CRC and SFC.

In order to attain the object, a method according to the present invention for producing a water absorbing agent is a method for producing a water absorbing agent including water absorbent resin particles, the method comprising the step (i) of mixing the water absorbent resin particles with a cationic polymer compound, the cationic polymer compound being obtained by containing a secondary amino group, and having a cationic value of from 1 to 22 mmol/g, and a secondary cationic value of from 0.1 to 11 mmol/g.

With the arrangement, it is possible to provide a water absorbing agent which is excellent in a balance between a centrifugal retention capacity (CRC) and a saline flow conductivity (SFC).

It is preferable to arrange the method according to the present invention for producing a water absorbing agent such that a solution, an emulsification solution, or a suspension solution of the cationic polymer compound containing the secondary amino group is mixed with the water absorbent resin particles. With the arrangement, it is possible to evenly mix the water absorbent resin particles with the cationic polymer compound. This results in further improvement of the balance between CRC and SFC.

It is preferable to arrange the method according to the present invention for producing a water absorbing agent so as to further include the step (ii) of cross-linking a surface of each of the water absorbent resin particles with a surface cross-linking agent.

With the arrangement, it is possible to reduce re-wet in exerting a pressure onto a swollen water absorbing agent. Thus, it is possible to enhance AAP, i.e., an absorbency against pressure.

It is preferable to arrange the method according to the present invention for producing a water absorbing agent so that the step (i) is carried out after the step (ii). With the arrangement, it is possible to further improve the balance between CRC and SFC. Besides, it is possible to avoid coloring caused by heat.

It is preferable to arrange the method according to the present invention for producing a water absorbing agent so that the water absorbent resin particles to be subjected to the step (i) are heated so that a temperature of the water absorbent resin particles ranges from 30 to 80° C. With the arrangement, it is possible to further improve the balance between CRC and SFC. Besides, it is possible to avoid coloring caused by heat.

It is preferable to arrange the method according to the present invention for producing a water absorbing agent so that the step (i) includes a sub step of further adding a water-soluble polyvalent metal salt and/or water-insoluble inorganic fine particles. With the arrangement, it is possible to further improve a centrifugal retention capacity (CRC) and a saline flow conductivity (SFC) of the water absorbing agent.

It is preferable to arrange the method according to the present invention for producing a water absorbing agent so that a mixture obtained in the step (i) is dried at a temperature equal to or lower than 100° C. after carrying out the step (i). If the mixture is dried at this temperature range, the water absorbing agent is free from any damage caused by heat. As a result, this does not have a damaging effect on the properties of the resultant water absorbing agent.

Effects of the Invention

As described above, a water absorbing agent according to the present invention is (i) a water absorbing agent, comprising: water absorbent resin particles; and a modified cationic polymer compound containing a primary amino group and/or a secondary amino group, the modified cationic polymer compound being obtained by reacting, with a modifying agent, a cationic polymer compound containing the primary amino group and/or the secondary amino group, and the modifying agent containing two or more carbon atoms continuously linked, and one reactive group which reacts with the primary amino group and/or the secondary amino group, or (ii) a water absorbing agent comprising: water absorbent resin particles; and a cationic polymer compound containing a secondary amino group, the cationic polymer compound having a cationic value of from 1 to 22 mmol/g, and a secondary cationic value of from 0.1 to 11 mmol/g. Thus, it is possible to provide (a) a water absorbing agent which is excellent in a balance between a centrifugal retention capacity (CRC) and a saline flow conductivity (SFC) and (b) a method for producing the water absorbing agent. Further, the present invention allows for production of water absorbent resin particles which is excellent in a balance between a centrifugal retention capacity (CRC) indicative of an absorption capacity of the water absorbing agent and a saline flow conductivity (SFC) indicative of liquid permeability, so that it is possible to provide (I) a water absorbing agent which allows an absorbent core to absorb liquid quickly and (II) a method for producing the water absorbing agent.

For a fuller understanding of the nature and advantages of the invention, reference should be made to the ensuing detailed description taken in conjunction with the accompanying drawings.

EXPLANATION OF REFERENCE NUMERALS

Figure 1:
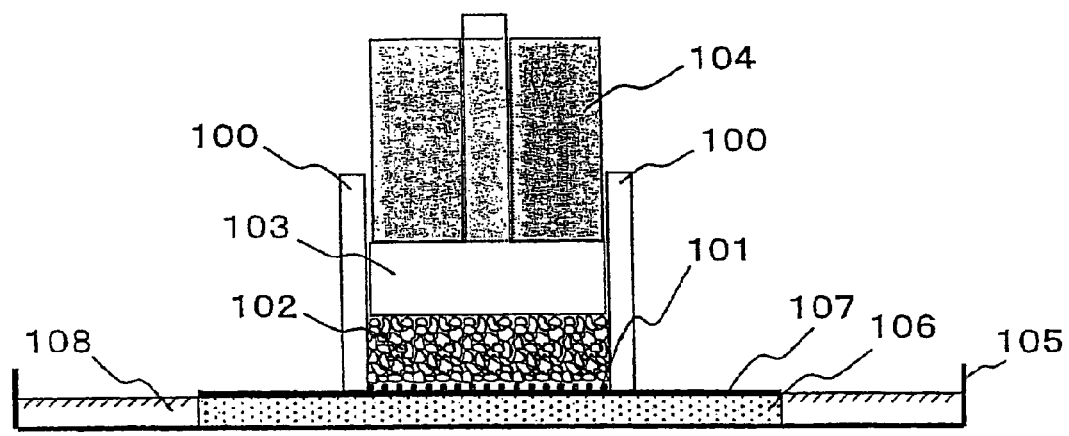
FIG. 1 is a schematic view illustrating a measuring apparatus of AAP, which was used in Examples.

31: Tank
32: Glass tube
33: 0.69 wt % saline
34: L-shaped Tube with cock
35: Cock
40: Vessel
41: Cell
42: Stainless metal net
43: Stainless metal net
44: Swelling gel
45: Glass filter
46: Piston
47: Hole of piston
48: Collecting vessel
49: Pan scales
100: Plastic supporting cylinder
101: Stainless metal net (400 mesh)
102: Swelling gel
103: Piston
104: Load (weight)
105: Petri dish
106: Glass filter
107: Filter paper
108: 0.9 wt % saline

BEST MODE FOR CARRYING OUT THE INVENTION

The following description explains the present embodiment. However, the scope of the present invention is not limited to this description, but rather may be applied in many variations within the spirit of the present invention. In the present invention, "weight" and "mass", and "weight %" and "mass %" are regarded having the same meaning; the expression used in the description is unified as "mass" and "mass %".

The following are definitions of abbreviations used in this description. In the present specification, a CRC (Centrifuge Retention Capacity) is a centrifuge retention capacity, and is a value obtained by a measuring method as explained in Examples later described. An SFC (Saline Flow Conductivity) is a conductivity of a saline flow, and is a value obtained by a measuring method as explained in Examples later described. An AAP (Absorbency against Pressure) is absorbency under a pressure of 4.83 kPa, and is a value obtained by a measuring method as explained in Examples later described. A D50 (Distribution) is a mass median particle size, and is a value obtained by a measuring method explained in Examples later described. A σξ is a logarithmic standard deviation of a particle size distribution, and is a value obtained by a measuring method explained in Examples later described. An FHA (Fixed Height Absorption) is a fixed height absorption, and is a value obtained by a measuring method explained in Examples later described. Moreover, in the present specification, saline denotes sodium chloride aqueous solution (0.9 mass %).

A water absorbing agent according to the present invention is an absorbing solidification agent of an aqueous liquid which absorbing solidification agent contains water absorbing resin particles, and further contains a modified cationic polymer compound.

The water absorbing agent according to the present invention is sufficient as long as the water absorbing agent contains water absorbing resin particles as its main component, and further contains a modified cationic polymer compound obtained by reacting, with a modifying agent, a cationic polymer compound containing a primary amino group and/or a secondary amino group, which modifying agent contains two or more adjacent carbon atoms and one reactive group which reacts with the primary amino group and/or the secondary amino group. Therefore, in the present invention, the water absorbing agent may be one which contains water absorbing resin particles as its main component, further contains the modified cationic polymer compound. The water absorbing agent may contain a small amount of an additive and/or water if necessary. In the present specification, the "main component" indicates that an amount of the water absorbing resin particles contained in the water absorbing agent is at least 50 mass % with respect to a whole amount of the water absorbing agent. The amount of the water absorbing resin particles contained in the water absorbing agent with respect to a whole amount of the water absorbing agent is preferably in a range of not less than 60 mass % but not more than 99.999 mass %, more preferably in a range of not less than 80 mass % but not more than 99.999 mass %, further preferably in a range of not less than 90 mass % but not more than 99.999 mass %, particularly preferably in a range of not less than 95 mass % but not more than 99.999 mass %, and is most preferred in a range of not less than 98 mass % but not more than 99.999 mass %.

An amount contained of the modified cationic polymer compound with respect to the whole amount of the water absorbing agent is preferably in a range of not less than 0.01 mass % but not more than 5 mass %, and is more preferably in a range of not less than 0.05 mass % but not more than 1 mass %.

The water absorbing agent preferably contains at least 0.01 mass % of the modified cationic polymer compound with respect to the whole amount of the water absorbing agent, so as to obtain a water absorbing agent having an excellent balance in a centrifuge retention capacity (CRC) and a saline flow conductivity (SFC). Moreover, the water absorbing agent preferably contains not more than 5 mass % of the modified cationic polymer compound with respect to the whole amount of the water absorbing agent, so as to prevent the CRC to decrease more than necessary.

Other than the water absorbing resin particles and the modified cationic polymer compound, water is a main component of the water absorbing agent according to the present invention, and other additives are used if necessary.

Moreover, the present embodiment encompasses a water absorbing agent comprising: water absorbent resin particles as its main component; and a cationic polymer compound containing a secondary amino group, the cationic polymer compound having a cationic value of from 1 to 22 mmol/g, and a secondary cationic value of from 0.1 to 11 mmol/g. It is sufficient for the water absorbing agent as long as its main component is the water absorbing resin particles and the water absorbing agent further contains a cationic polymer compound containing a secondary amino group. The water absorbing agent may contain a small amount of an additive and/or water if necessary.

An amount of the cationic polymer compound containing the secondary amino group with respect to the whole water absorbing agent is preferably not less than 0.01 mass % but not more than 5 mass %, more preferably not less than 0.05 mass % but not more than 1 mass %.

If the amount of the cationic polymer compound containing the secondary amino group with respect to the whole water absorbing agent is not less than 0.01 mass %, it is possible to attain a water absorbing agent having an excellent balance between a centrifugal retention capacity (CRC) and a saline flow conductivity (SFC). If the amount of the cationic polymer compound containing the secondary amino group with respect to the whole water absorbing agent is not more than 5 mass %, CRC will not be lowered more than necessary.

As to other contents in the water absorbing agent than the water absorbing resin particles, and the cationic polymer compound containing the secondary amino group, the other contents contains water as the main component and may contain an additive if necessary.

In the present specification, the cationic value is expressed by a number of moles per unit mass of nitrogen that can be protonated, in the cationic polymer compound or modified cationic compound. Further, in the present specification, the secondary cationic value is a value expressing a number of moles per unit mass of secondary amino group in the cationic polymer compound. The unit of the cationic value and the secondary cationic value is mmol/g (or mol/kg).

The number of moles of the secondary amino group can be measured by using a well-known technique such as titration, NMR (for example, a peak area ratio of $^{13}$CNMR), for example. Moreover, the number of moles of the secondary amino group can be worked out from a structure of a polymer, a number of moles of a reactive material, or the other factor.

The water absorbing agent is an absorbing solidification agent of an aqueous liquid. The aqueous liquid is not limited to water, and is not particularly limited as long as the aqueous liquid contains water, for example urine, blood, excrement, waste fluid, moisture and vapor, ice, a mixture of water and an organic solvent and/or an inorganic solvent, rainwater, ground water, and the like. However, urine, particularly urine of human beings is preferred.

The following description sequentially explains (1) water absorbing resin particles contained in water absorbing agent of the present invention, (2) modified cationic polymer compound, (3) other additives, (4) water absorbing agent, (5) method of producing water absorbing agent, (6) absorbing material, and (7) water absorbing agent containing water absorbing resin particles and the cationic polymer compound having a cationic value of from 1 to 22 mmol/g, and a secondary cationic value of from 0.1 to 11 mmol/g.

(1) Water Absorbing Resin Particles Contained in Water Absorbing Agent of Present Invention Water absorbing resin particles to be used in the water absorbing agent according to the present invention are particles of a water-insoluble water-swelling hydrogel-forming polymer (hereinafter the water absorbing resin may be referred to as water-insoluble water-swelling hydrogel-forming polymer in the present specification), which is obtainable by polymerizing a water-soluble unsaturated monomer.

Specific examples of the water-insoluble water-swelling hydrogel-forming polymer encompass: a partially neutralized, cross-linked polyacrylic acid polymer (e.g., U.S. Pat. No. 4,625,001, U.S. Pat. No. 4,654,039, U.S. Pat. No. 5,250,640, and U.S. Pat. No. 5,275,773, and European patent No. 456136), a cross-linked and partially neutralized starch-acrylic acid-grafted polymer (U.S. Pat. No. 4,076,663), an isobutylene-maleic copolymer (U.S. Pat. No. 4,389,513), a saponified vinyl acetate-acrylic acid copolymer (U.S. Pat. No. 4,124,748), a hydrolysate of acrylamide (co)polymer (U.S. Pat. No. 3,959,569), and a hydrolysate of acrylonitrile polymer (U.S. Pat. No. 3,935,099).

The water absorbing resin particles contained in the water absorbing agent of the present invention are more preferably particles of water absorbing resin made of a polyacrylic acid (salt) cross-linked polymer obtained by polymerizing a monomer containing acrylic acid and/or a salt thereof, as the water-soluble unsaturated monomer. The polyacrylic acid (salt) cross-linked polymer denotes a cross-linked polymer obtained by polymerizing a monomer containing at least 50 mol %, preferably not less than 70 mol %, more preferably not less than 90 mol % of acrylic acid and/or the salt thereof.

Moreover, at least 50 mol % but not more than 90 mol %, more preferably not less than 60 mol % but not more than 80 mol % of an acid group of the polyacrylic acid (salt) cross-linked polymer is preferably neutralized. Examples of the polyacrylic acid salt encompass: alkaline metal salts such as sodium, potassium, and lithium; ammonium salt; and amine salt. Among these, it is preferable for the polyacrylic acid salt to be sodium salt. Neutralization in order to form the salt may be carried out in a monomer state prior to the polymerization, or may be carried out during the polymerization or after the polymerization in a polymer state. Alternatively, the neutralization may be carried out in both states.

The polyacrylic acid (salt) cross-linking polymer that is preferably used as the water absorbing resin particles used in the water absorbing agent according to the present invention may be one which another monomer is copolymerized with the monomer used as the main component (acrylic acid and/or the salt thereof) if necessary.

Examples of the another monomer encompass: anionic unsaturated monomers and salts thereof such as methacrylic acid, maleic acid, vinyl sulfonic acid, stylene sulfonic acid, 2-(meth)acrylamide-2-methylpropanesulfonic acid, 2-(meth)acryloylethane sulfonic acid, and 2-(meth)acryloylpropane sulfonic acid; nonionic unsaturated monomers containing a hydrophilic group, such as acrylamide, methacrylamide, N-ethyl(meth)acrylamide, N-n-propyl(meth)acrylamide, N-isopropyl(meth)acrylamide, N,N-dimethyl(meth)acrylamide, 2-hydroxyethyl(meth)acrylate, 2-hydroxypropyl(meth)acrylate, methoxy polyethylene glycol(meth)acrylate, polyethylene glycol mono(meth)acrylate, vinylpyridine, N-vinylpyrrolidon, N-acryloyl piperidine, N-acryloyl pyrrolidine, and N-vinyl acetamide; and cationic unsaturated monomers such as N,N-dimethylaminoethyl (meth)acrylate, N,N-diethylaminoethyl(meth)acrylate, N,N-dimethylaminopropyl(meth)acrylate, N,N-dimethylaminopropyl(meth)acrylamide, and quaternary salts thereof. A using amount of the other monomer is preferably in a range of not less than 0 mol % but not more than 30 mol % with respect to a whole monomer amount, and is more preferably is in a range of not less than 0 mol % but not more than 10 mol %.

It is preferable for the water absorbing resin particles that are used in the present invention to be a cross-linked polymer having an internal cross-linked structure. The following methods are examples of a method as to introduce the internal cross-linked structure to the water absorbing resin particles: a method introducing the internal cross-linked structure by self-cross-linking without use of a cross-linking agent; a method introducing the internal cross-linked structure by copolymerizing or reacting an internal cross-linking agent having at least two polymerized unsaturated groups and/or at least two reactive groups in one molecule; and the like. Among these methods, it is preferable to use the method introducing the internal cross-linked structure by copolymerizing or reacting the internal cross-linking agent.

Specific examples of the internal cross-linking agent encompass: N,N'-methylene bis(meth)acrylamide, (poly)ethylene glycol di(meth)acrylate, (poly)propylene glycol di(meth)acrylate, trimethylolpropane tri(meth)acrylate, trimethylolpropane di(meth)acrylate, glycerol tri(meth)acrylate, glycerol acrylate methacrylate, ethylene oxide denatured trimethylolpropane tri(meth)acrylate, pentaerythritol tetra(meth)acrylate, dipentaerythritol hexa(meth)acrylate, triallylcyanurate, triallylisocyanurate, triallylphosphate, triallylamine, poly(meth)allyoxyalkane, (poly)ethylene glycol diglycidyl ether, glycerol diglycidyl ether; polyalcohols such as ethylene glycol, polyethylene glycol, 1,4-butanediol, propylene glycol, glycerin, and pentaerythritol; ethylenediamine, polyethyleneimine, and glycidyl (meth)acrylate.

One type or two or more types of the internal cross-linking agents may be used. In particular, it is preferable to essentially use, as the internal cross-linking agent, a compound having at least two polymerized unsaturated groups, in view of water absorbing characteristics of the water absorbing resin particles thus obtained.

A using amount of the internal cross-linking agent is preferably in a range of not less than 0.005 mol % but not more than 3 mol % with respect to the whole monomer amount, and is further preferably in a range of not less than 0.01 mol % but not more than 1.5 mol %, and is most preferred in a range of not less than 0.05 mol % but not more than 0.2 mol %.

In polymerization, a hydrophilic polymer or chain transfer agent may be added. Examples of the hydrophilic polymer encompass: hydrophilic polymers such as starch-cellulose, a derivative of starch-cellulose, polyvinyl alcohol, polyacrylic acid and/or a salt thereof, and a cross-linked polymer of polyacrylic acid and/or a salt thereof. Examples of the chain transfer agent encompass hypophosphorous acid and/or a salt thereof.

In polymerizing a monomer whose main component is the acrylic acid and/or the salt thereof, bulk polymerization, reversed phase suspension polymerization, or precipitation polymerization may be carried out. However, from views of functions and ease in controlling the polymerization, it is more preferable to carry out aqueous solution polymerization, in which the monomer is made into an aqueous solution. Such polymerization method is described, for example, in U.S. Pat. No. 4,625,001, U.S. Pat. No. 4,769,427, U.S. Pat. No. 4,873,299, U.S. Pat. No. 4,093,776, U.S. Pat. No. 4,367,323, U.S. Pat. No. 4,446,261, U.S. Pat. No. 4,683,274, U.S.

Pat. No. 4,690,996, U.S. Pat. No. 4,721,647, U.S. Pat. No. 4,738,867, and U.S. Pat. No. 4,748,076, and in U.S. patent publication No. 2002/40095.

In the polymerization, radical polymerization initiators such as potassium persulfate, ammonium persulfate, sodium persulfate, t-butyl hydroperoxide, hydrogen peroxide, and 2,2-azobis(2-amidinopropane)dihydrochloride, and activated energy rays such as ultraviolet rays and electron beams may be used. In a case where the radical polymerization initiator is used, a reducing agent such as sodium sulfite, sodium bisulfite, ferrous sulfate, and L-ascorbic acid may be used together with the radical polymerization initiator, so as to carry out a redox polymerization. A using amount of the polymerization initiator is preferably in a range of not less than 0.001 mol % but not more than 2 mol % with respect to the whole monomer amount, and is more preferably in a range of not less than 0.01 mol % but not more than 0.5 mol %.

A shape of the water absorbing resin particles thus obtained by the polymerization is generally an irregularly-pulverized shape, a sphere shape, a fiber shape, a bar shape, a substantially sphere shape, a flat shape, or the like. However, it is preferable for the shape of the water absorbing resin particles to be the irregularly-pulverized shape. The water absorbing resin particles in the irregularly-pulverized shape allows effective presence of a modified cationic polymer compound on a surface of the water absorbing resin particles.

In a case where the cross-linked polymer is obtained by the aqueous polymerization and is of a gel form, in other words, the cross-linked polymer is a hydrous gel cross-linked polymer (hereinafter may be referred to as hydrous gel), the hydrous gel cross-linked polymer is dried, and is usually pulverized before and/or after drying so as to obtain the water absorbing resin particles. In the present invention, drying denotes an operation to increase solid content. Usually, the solid content is to increase as compared to that of which is not dried, however is more preferably increased so that the solid content increases to at least 90 mass %, and having an upper limit of approximately 99 mass %. The drying may be carried out concurrently with the polymerization, or both the drying during the polymerization and the drying after the polymerization may be carried out. However, it is preferable to provide a drying step after the polymerization, for drying the hydrous gel cross-linked polymer by use of a drying device. In the present invention, it is preferable for the water absorbing resin which has been dried to have the solid content of at least 90 mass %, and further preferably not less than 95 mass %. Low solid content not only worsens fluidity of the water absorbing resin, which causes difficulty in production, but also makes it difficult to pulverize the water absorbing resin. This may cause loss in control of producing a specific particle size distribution. Note that the solid content of the water absorbing resin is indicative of a value to be measured by a measuring method later described.

In the present invention, the drying is carried out in a temperature range of 100° C. to 250° C., for at least 50% of a whole time of the drying step, and preferably during the whole drying step. A temperature less than 100° C. causes undried products to occur, which not only effects pulverizing of the water absorbing resin particles, but also makes it difficult to control the particle size distribution. A drying temperature of not less than 250° C. causes damage to the water absorbing resin. This damage causes an increase in water-soluble content of the water absorbing resin. As a result, an enhancement effect of physical properties may not appear. Drying temperature is defined by a heat carrier, however if it is not possible to define the drying temperature by the heat carrier, for example in a case of a microwave, the drying temperature is defined by material temperature. A drying method is not particularly limited as long as the drying temperature is in the above range, and methods such as hot air drying, no-wind drying, vacuum drying, infrared ray drying, or microwave drying are suitably used. In particular, it is preferable to use the hot air drying method. A drying airflow in a case where the hot air drying is used is preferably in a range of 0.01 m/sec to 10 m/sec, and more preferably in a range of 0.1 m/sec to 5 m/sec.

The drying temperature is preferably in a range of 130° C. to 220° C., and is further preferably in a range of 150° C. to 200° C. The drying may be carried out at a fixed temperature or at varying temperatures, however is preferable so that the whole drying step is carried out in the above temperature range, effectively.

A drying time differs depending on a surface area and moisture content of the polymer and a type of drying machine, and is appropriately selected so that the polymer attains a target moisture content. The drying time is usually in a range of 10 to 120 minutes, more preferably in a range of 20 to 90 minutes, and further preferably in a range of 30 to 60 minutes. If the drying time is less than 10 minutes, changes which occur in the polymer chain internal of the water absorbing resin particles are small. With such small change, a sufficient improvement effect is unlikely to be attained. As a result, an enhancement effect of the physical properties may not appear. In comparison, the drying time of not less than 120 minutes causes the water absorbing resin particles to be damaged. As a result, the amount of the water-soluble content increases, thereby causing the enhancement effect of the physical properties to not appear.

The water absorbing resin thus obtained is crushed by a crushing machine. Crushing may be carried out at any timing, before the drying, during the drying, or after the drying, however it is preferably carried out after the drying. The crushing machine is not particularly limited, and a roller-type crushing machine (e.g. roller mill), a hammer type crushing machine (e.g. hammer mill), an impact mill, a cutter mill, a turbo grinder, a ball mill, a flash mill or the like is used for example. In particular, it is preferable to use the roller mill in order to control the particle size distribution. It is more preferable to crush the water absorbing resin for at least two times consecutively in order to control the particle size distribution, and is further preferable to crush the water absorbing resin for at least three times consecutively. In the case the water absorbing resin is crushed for at least two times, the crushing machine thus used may be same or different to each other. It is also possible to use different types of crushing machines combined.

In order to control the water absorbing resin particles thus crushed in a specific particle size distribution, the water absorbing resin particles may be classified by use of a sieve having a specific opening size. A classifying machine that is used for classifying the water absorbing resin particles by use of the sieve is not particularly limited. For example, a vibrating sieve (i.e., an unbalanced weight-driven method, a resonant method, a vibrating motor method, an electromagnetic method, and a circular vibration method), in-plane motion sieve (i.e., a horizontal motion method, a horizontal circle-linear motion method, and a three-dimensional motion method), a movable net sieve, a compulsory stirring sieve, a net plane vibration sieve, a wind force sieve, a sonic sieve, and the like are used. Among these methods, the vibrating sieve or the in-plane motion sieve is preferably used. The opening of the sieve is preferably in a range of 1000 μm to 300 μm, more preferably in a range of 900 μm to 400 μm, and further preferably in a range of 710 µm to 450 µm. The target particle size distribution may not be attained if the opening is of a size not within this range.

In order to control the water absorbing resin particles thus classified as the above into a further specific particle size distribution, the water absorbing resin particles may be further classified, so as to remove a part or all of the particles that are smaller than the specific particle size. A classifying machine to be used in such step is not particularly limited, however the aforementioned machines are preferably used, and other machines such as a pulverizing type classification device (e.g., centrifugal force type, inertial force type) may also be used. In the present step, a part or all of the particles having a particle size of less than 200 µm, more preferably less than 150 µm, and most preferably less than 106 µm, is to be removed.

The water absorbing resin particles used in the present invention is more preferably surface cross-linked with an organic surface cross-linking agent and/or a water-soluble inorganic surface cross-linking agent, each of which is a surface cross-linking agent, on a shallow surface of the water absorbing resin particles. The water absorbing resin particles whose shallow surface is surface cross-linked by the surface cross-linking agent, which water absorbing resin particles are contained in the water absorbing agent, allows reduction of rewet occurring when pressure is given on a swollen water absorbing agent. Therefore, an AAP, in other words, absorbency against pressure, is improved.

The surface cross-linking by use of the surface cross-linking agent may be carried out at any stage of production, however is preferably carried out after the water absorbing resin particles are controlled to a specific particle size distribution.

An example of the surface cross-linking agent usable for the surface cross-linking process includes a surface cross-linking agent which contains at least two functional groups that can react with a functional group contained in the water absorbing resin particles, for example a carboxyl group. Such surface cross-linking agent may be organic or inorganic, however in particular, a water-soluble organic surface cross-linking agent is suitably used.

Examples of the surface cross-linking agent encompass: polyalcohols such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerol, 2-butene-1,4-diol, 1,3-butanediol, 1,4-butanediol, 1,5-pentanediol, 1,6-hexanediol, 1,2-cyclohexandimethanol, 1,2-cyclohexanol, trimethylolpropane, diethanolamine, triethanolamine, polyoxypropylene, oxyethylene-oxypropylene block copolymer, pentaerythritol, and sorbitol; epoxy compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, and glycidol; polyvalent amine compounds such as ethylenediamine, diethylenetriamine, triethylenetetramine, tetraethylenepentamine, pentaethylenehexamine, and polyethyleneimine, and inorganic or organic salts thereof (for example, azetidinium salt and the like); polyvalent isocyanate compounds such as 2,4-tolylene diisocyanate and hexamethylene diisocyanate; polyvalent oxazoline compounds such as 1,2-ethylene bisoxazoline; carbonic acid derivatives such as urea, thiourea, guanidine, dicyandiamide, and 2-oxazolidinone; alkylene carbonate compounds such as 1,3-dioxolane-2-one, 4-methyl-1,3-dioxolane-2-one, 4,5-dimethyl-1,3-dioxolane-2-one, 4,4-dimethyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, and 1,3-dioxopane-2-one; haloepoxy compounds and its polyvalent amine additives (for example "Kymene" produced by Hercules Inc.: Registered Trademark) such as epichlorohydrin, epibromhydrin, and α-methylepichlorohydrin; silane coupling agents such as γ-glycidoxypropyltrimethoxysilane, and γ-aminopropyltriethoxysilane; and oxetane compounds such as 3-methyl-3-oxetanemethanol, 3-ethyl-3-oxetanemethanol, 3-ethyl-3-oxetaneethanol, 3-butyl-3-oxetaneethanol, 3-chloromethyl-3-methyloxetane, 3-chloromethyl-3-ethyloxetane, and polyvalent oxetane compounds.

One type of the surface cross-linking agent may be used, or two or more types of the surface cross-linking agent may be used combined. In particular, the polyalcohols are preferred for their high safeness and improvement in hydrophilicity of the surface of the water absorbing resin particles.

A using amount of the surface cross-linking agent is preferably in a range of not less than 0.001 parts by mass but not more than 5 parts by mass, with respect to 100 parts by mass of solid content of the water absorbing resin particles.

Water may be used in mixing the surface cross-linking agent and the water absorbing resin particles. A using amount of the water is preferably in a range of more than 0.5 parts by weight but not more than 10 parts by weight, with respect to 100 parts by weight of the solid content of the water absorbing resin particles, and is more preferably in a range of not less than 1 parts by mass but not more than 5 parts by mass.

When the surface cross-linking agent or an aqueous solution thereof is mixed with the water absorbing resin particles, a hydrophilic organic solvent or a third material may be used as a mixing auxiliary agent. In a case where the hydrophilic organic solvent is used, a hydrophilic solvent described in International Publication No. 2004/069915 may be used for example.

A using amount of the hydrophilic organic solvent, although depending on type, particle size, and moisture content of the water absorbing resin particles, is preferably not more than 10 parts by mass with respect to 100 parts by mass of the solid content of the water absorbing resin particles, and is more preferably in a range of not less than 0 parts by mass but not more than 5 parts by mass.

Moreover, inorganic acids, organic acids, polyamino acids and the like described in European Patent No. 0668080 may exist as the third material. These mixing auxiliary agents may work as the surface cross-linking agent, however is preferably one which does not decrease water absorbing ability of the water absorbing resin particles that are obtained after the surface cross-linking. The water absorbing resin particles used in the present invention is preferably cross-linked by (i) mixing the water absorbing resin particles with a surface cross-linking agent, which surface cross-linking agent does not contain a hydrophilic organic solvent having a boiling point of not more than 100° C., and (ii) heating this mixture. If the water absorbing resin particles contain the hydrophilic organic solvent having a boiling point of not more than 100° C., physical properties such as an SFC may not be sufficiently attained, due to a condition change of the surface cross-linking agent on the surface of the water absorbing resin particles caused by vaporization of the hydrophilic organic solvent.

In order to evenly mix the water absorbing resin particles and the surface cross-linking agent, it is preferable to have a water-soluble inorganic salt (more preferably persulfate) coexist with the water absorbing resin particles and the surface cross-linking agent, when the water absorbing resin particles and the surface cross-linking agent are mixed together. Although dependent on the type, particle size and the like of the water absorbing resin particles, a using amount of the water-soluble inorganic salt is preferably in a range of not less than 0.01 parts by mass but not more than 1 parts by mass with respect to 100 parts by mass of the solid content of the water absorbing resin particles, and is more preferably in a range of not less than 0.05 parts by mass but not more than 0.5 parts by mass. Namely, the water absorbing resin particles are preferably cross-linked by (i) mixing the water absorbing resin particles with an organic surface cross-linking agent containing a water-soluble inorganic salt, preferably persulfate, and/or a water-soluble inorganic surface cross-linking agent in an amount not less than 0.01 mass % but not more than 1.0 mass % based on the water absorbing resin particles, and (ii) heating this mixture.

A mixing method for mixing the water absorbing resin particles and the surface cross-linking agent is not particularly limited. Examples of the methods that are possibly used encompass: a method in which a surface cross-linking agent that is dissolved in water and/or a hydrophilic organic solvent if necessary is mixed with water absorbing resin particles which are soaked in the hydrophilic organic solvent; and a method in which a surface cross-linking agent that is dissolved in water and/or a hydrophilic organic solvent is sprayed or dropped directly to the water absorbing resin particles.

After the water absorbing resin particles and the surface cross-linking agent are mixed, it is usually preferable to heat the mixture so as to carry out a cross-linking reaction. A heating temperature, although dependent on the surface cross-linking agent which is to be used, is preferably in a range of not less than 40° C. but not more than 250° C., is more preferably in a range of not less than 100° C. but not more than 240° C., and is further preferably not less than 150° C. but not more than 230° C. If the heating temperature is less than 40° C., absorbing properties such as the AAP and the SFC may not be sufficiently improved. The heating temperature exceeding 250° C. causes the water absorbing resin particles to deteriorate, which may cause various physical properties to decrease. Therefore, care is required in the heating temperature. Heating is preferably carried out for not less than 1 minute to not more than 2 hours, and more preferably for not less than 5 minutes to not more than 1 hour.

The water absorbing resin particles used in the present invention preferably has a mass median particle size in a range of not less than 100 µm but not more than 600 µm, more preferably in a range of not less than 200 µm but not more than 500 µm, and is most preferred to be in a range of not less than 300 µm but not more than 400 µm. If the mass median particle size of the water absorbing resin particles are not in the range of not less than 100 µm to not more than 600 µm, fluid permeability/diffusibility may significantly decrease, or absorbing speed may remarkably slow down. Use of such water absorbing resin particles, for example in disposable diapers, may cause leaking of fluid or the like.

The water absorbing resin particles used in the present invention preferably includes at least 50 mass % of water absorbing resin particles having a size in a range of not less than 175 µm to not more than 710 µm, and more preferably includes at least 80 mass % of the water absorbing resin particles of that size.

In addition, an amount of particles having a size which can pass through a sieve with openings of 150 µm thus included in the water absorbing resin particles used in the present invention is preferably not more than 5 mass %, more preferably not more than 3 mass %, and further preferably not more than 1 mass %, with respect to the whole mass of the water absorbing resin particles. Use of the water absorbing resin particles including not more than 5 mass % of particles having the size which can pass through the sieve with openings of 150 µm with respect to the whole mass of the water absorbing resin particles for the water absorbing agent, allows suppression of an amount of dust in the water absorbing agent thus obtained. Therefore, it is possible to prevent a safety and sanitation problem caused by dispersion of fine particles contained in the water absorbing resin particles at the time of producing the water absorbing agent. Moreover, it is possible to prevent decrease in physical property of the water absorbing agent thus obtained. If the amount exceeds 5 mass %, the dust is readily generated at the time of producing the water absorbing agent. As a result, the safety and sanitation problem may occur, or the physical property of the water absorbing agent may decrease.

Furthermore, as the water absorbing resin particles, fine water absorbing resin particles having a mass median particle size of not more than 300 µm (hereinafter suitably referred to as "fine powder") that are agglomerated, dried, adjusted in particle size and surface cross-linked may be used. Water absorbing resin particles which are obtained by partially mixing agglomerated products of the fine powder with the water absorbing resin particles i.e., primary particles obtained by pulverization and having an irregularly-pulverized shape may also be used as the water absorbing resin particles. By thus partially mixing the agglomerated product of the fine powder with the water absorbing resin particles, a water absorbing agent having further excellent absorbing properties such as water absorbing speed, and fixed height absorption (FHA) as described in U.S. patent publication No. 2005/0003191A1, is obtainable. An amount mixed of the agglomerated product of the fine powder contained in the water absorbing resin particles is preferably at least 5 mass %, more preferably not less than 10 mass %, further preferably not less than 15 mass %, and most preferred to be not less than 20 mass %. Note that particle size of the fine powder is indicated by the opening size of the sieve of which is used for classifying the fine powder.

Known techniques for reproducing the fine powder are usable, as a method for producing the agglomerated product of the fine powder. For example, the following methods are usable: a method in which warm water and the fine powder is mixed and dried (U.S. Pat. No. 6,228,930); a method in which the fine powder and a monomer aqueous solution is mixed and polymerized (U.S. Pat. No. 5,264,495); a method in which water is added to the fine powder so as to agglomerate by applying a specific plane pressure (European patent No. 844270); a method in which fine powder is sufficiently swollen so as to form an amorphous gel, then drying and crushing the amorphous gel (U.S. Pat. No. 4,950,692); and a method in which the fine powder and a polymerized gel is mixed (U.S. Pat. No. 5,478,879).

In particular, it is preferable to use the method in which the fine powder is mixed with warm water and is dried, as the production method of the agglomerated fine powder. The water absorbing resin particles agglomerated in this method has a porous structure (a same structure as a porous structure described in Japanese Unexamined Public Publication, Tokukai, No. 2004-261797), and therefore is preferable. It is preferable for the water absorbing resin particles used in the present invention to include particles having the porous structure by at least 5 mass %, more preferably not less than 10 mass %, further preferably not less than 15 mass %, and particularly preferably not less than 20 mass %. By thus having the water absorbing resin particles contain the agglomerated fine powder having the porous structure, the water absorbing resin particles and a water absorbing agent thus containing the water absorbing resin particles excel in the fixed height absorption (FHA).

A CRC of the water absorbing resin particles to be used in the present invention is preferably not less than 5 (g/g), more preferably not less than 15 (g/g), and further preferably not less than 25 (g/g). An upper limit of the CRC is not particularly limited, however is preferably not more than 60 (g/g), more preferably not more than 50 (g/g), and further preferably not more than 40 (g/g). The CRC less than 5 (g/g) causes an absorbing amount to be insufficient in order to be used as the water absorbing agent. Therefore, appropriate use in sanitary material such as disposable diaper and the like is not possible. If the CRC is more than 50 (g/g), attainment of a water absorbing agent having excellent fluid retaining speed in the absorbent core may be difficult, when the water absorbing resin particles are used in the water absorbing agent.

An AAP of the water absorbing resin particles used in the present invention is not less than 8 (g/g), preferably not less than 16 (g/g), more preferably not less than 20 (g/g), further preferably not less than 22 (g/g), and most preferably not less than 24 (g/g). An upper limit of the AAP is not particularly limited, however is preferably not more than 30 (g/g). If the AAP is less than 8 (g/g), a water absorbing agent having few so-called rewet, which rewet occurs when the water absorbing agent is pressured, may not be attained.

The SFC of the water absorbing resin particles used in the present invention is preferably not less than 10 ($10^{-7} \cdot cm^3 \cdot s \cdot g^{-1}$), more preferably not less than 30 ($10^{-7} \cdot cm^3 \cdot s \cdot g^{-1}$), and further preferably not less than 50 ($10^{-7} \cdot cm^3 \cdot s \cdot g^{-1}$). The SFC less than 10 ($10^{-7} \cdot cm^3 \cdot s \cdot g^{-1}$) disables improvement in fluid permeability, thereby in a case where the water absorbing resin particles are used in the water absorbing agent, a water absorbing agent which excels in fluid retaining speed in the absorbent core may not be attained. An upper limit of the SFC is not particularly limited, however is preferably not more than 3000 ($10^{-7} \cdot cm^3 \cdot s \cdot g^{-1}$), and is more preferably not more than 2000 ($10^{-7} \cdot cm^3 \cdot s \cdot g^{-1}$). If the SFC is more than 3000 ($10^{-7} \cdot cm^3 \cdot s \cdot g^{-1}$), liquid leakage from the absorbent core may occur when the water absorbing resin particles are used in a water absorbing agent.

It is preferable for the water absorbing resin particles according to the present embodiment to have water-soluble content of not more than 35 mass %, more preferably not more than 25 mass %, and further preferably not more than 15 mass %. If the water-soluble content exceeds 35 mass %, the water absorbing resin particles weaken in gel strength, and become poor in liquid permeability. Moreover, when the water absorbing resin particles are used in the water absorbing agent, it may be difficult to obtain a water absorbing agent which can be applied to an absorbing material as a water absorbing agent from which an amount of liquid squeezed out (so-called re-wet) is little when a pressure is applied to the absorbing material.

(2) Modified Cationic Polymer Compound

In a water absorbing agent of the present invention, a modified cationic polymer compound exists on a surface of each of the water absorbent resin particles. The surface of each of the water-absorbent resin particles herein refers to: a portion of each of the water-absorbent resin particles which portion is exposed to the air; and/or a portion (shallow surface) to the above portion which portion (shallow surface) has a thickness of a tenth of the particle size (major axis). The major axis refers to the longest distance obtainable between two random points on the surface (portion exposed to the air) of each of the particles. It is possible to increase SFC of the water absorbing agent without declining CRC of the water absorbing agent because the modified cationic polymer compound exists on the surface of each of the water absorbent resin particles. In other words, it is possible to improve liquid permeability of the water absorbing agent. In order to improve the liquid permeability, the modified cationic polymer compound may exist on a part of the water absorbent resin particle which is exposed to outer air and/or within a tenth portion of the particle diameter (major axis) from the surface of the water absorbent resin particle. It is more preferable that the modified cationic polymer compound exists on a portion of the water absorbent resin particle which is exposed to outer air for improving properties of the water absorbing agent.

A modified cationic polymer compound used for a water absorbing agent of the present invention is obtained by modifying, with a modifying agent, a cationic polymer compound containing a primary amino group and/or a secondary amino group, and the modifying agent contains two or more continuously chained carbon atoms and one reactive group which reacts with the primary amino group and/or the secondary amino group. In other words, the modified cationic polymer compound is obtained by reacting with the modifying agent, the cationic polymer compound containing the primary amino group and/or the secondary amino group.

As for a cationic polymer compound as a precursor of the modified cationic polymer compound, a cationic polymer compound containing a primary amino group and/or a secondary amino group is preferably used. The primary amino group and/or the secondary amino group may exist as a salt thereof. In this specification, the salt of the primary amino group or the secondary amino group is not specifically limited as long as the primary amino group or the secondary amino group is neutralized by an inorganic acid or an organic acid. Examples of the inorganic acid salts encompass: hydrochloride salt, sulphate salt, nitrate salt, and the like. Also, the organic acid salt is not specifically limited as long as the organic acid salt contains 1 or less continuously chained carbon number, for example, a salt of formate, and the like.

More specifically, examples of the cationic polymer compounds encompass: polyalkyleneimines such as polyethylenimine; polyether polyamine, polyetheramine, polyvinylamine, polyalkylamine, polyallylamine, polydiallylamine, poly(N-alkyl allylamine), monoallylamine-diallylamine copolymer, N-alkylallylamine-monoallylamine copolymer, monoallylamine-dialkyldiallyl ammonium salt.copolymer, diallylamine-dialkyldiallyl ammonium salt.copolymer, polyethylene polyamine, polypropylene polyamine, polyamidine, and the like; salts thereof; reactants with electrophilic agents thereof; modified polyamide amine modified by grafting of ethylene imine, protonated polyamide amine, a condensate of polyamide amine and epichlorohydrin, a condensate of an amine and epichlorohydrin, poly(vinylbenzyldialkylammonium, poly(diallylalkylammonium), poly(2-hydroxy-3-methacryloyloxypropyldialkylamine), a partially hydrolyzed poly(N-vinylformamide), a partially hydrolyzed poly(N-vinylalkylamide), partially hydrolyzed copolymer of (N-vinylformamide-(N-vinylalkylamide), polyvinylimidazole, polyvinylpyridine, polyvinylimidazoline, polyvinyltetrahydropyridine, polydialkylaminoalkylvinylether, polydialkylaminoalkyl(meth)acrylate, polyallylamine, polyamidine (compounds described in Japanese Patent No. 2624089), and the salts thereof.

Among them, cationic polymer compounds containing at least one selected from the group consisting of polyvinyl amine, the salt thereof, partially hydrolyzed poly(N-vinylformamide), and the salt thereof.

In the present specification, the partially hydrolyzed poly (N-vinylformamide) may be referred to as polyvinylamine. Moreover, the modified partially hydrolyzed poly(N-vinylformamide) later described may be referred to as modified polyvinylamine, similarly.

Hydrolysis percentage of the partially hydrolyzed poly(N-vinylformamide) is preferably in a range of 1 to 99%, more preferably in a range of 3 to 97%, further preferably in a range of 6 to 95%, and especially preferably in a range of 10 to 80%.

The cationic polymer compound may be used solely or two or more of them may be used in combination.

Above all, polyalkyleneimines such as polyethylenimine; polyallylamine, and the like are preferably used as the cationic polymer compound in view of improving liquid permeability more efficiently. Note that the polyalkyleneimine and the like may have a straight- or branched-chain structure.

A weight-average molecular weight of the cationic polymer compound is preferably 5000 or more, is more preferably 10,000 or more, and is further preferably 30,000 or more. In a case where the weight-average molecular weight is less than 5000, an expected effect might not be obtained. Note that the upper limit of the weight-average molecular weight of the cationic polymer compound is not specifically limited, however, it is preferably 1,000,000 or less, and is more preferably 500,000 or less. The weight-average molecular weight of the cationic polymer compound is preferably 1,000,000 or less because its viscosity becomes low and handleability and mixability are excellent. Note that the weight-average molecular weight can be measured by known methods such as GPC, viscometry, static light scattering, and the like.

A modified cationic polymer compound used for a water absorbing agent of the present invention is obtained by reacting the cationic polymer compound with a modifying agent, the modifying agent may contain two or more continuously chained carbon atoms and one reactive group which reacts with the primary amino group and/or the secondary amino group.

Since the modifying agent contains two or more continuously chained carbon atoms, and one reactive group which reacts with the primary amino group and/or the secondary amino group, the reactive group reacts with the primary amino group and/or the secondary amino group of the cationic polymer compound. As a result, the two or more continuously chained carbon atoms of the modifying agent combine with the primary amino group and/or secondary amino group, directly or indirectly. Further, since the modifying agent contains one reactive group which reacts with the primary amino group and/or the secondary amino group, the modifying agent reacts non-crosslinkingly with the cationic polymer compound. Therefore, the two or more carbon atoms, which are directly or indirectly combined with a great number of primary amino group and/or the secondary amino group, work efficiently to form a stable space between the water absorbent resin particles. Therefore, it is considered resulting in improving the liquid permeability of the water absorbing agent to be obtained. Thus, it is considered that it is possible to obtain the water absorbing agent which is excellent in a balance between a centrifugal retention capacity (CRC) and a saline flow conductivity (SFC) because a modified cationic polymer compound, which is obtained by using the modifying agent, exists on a surface of the water absorbent resin particle.

The modifying agent may contain two or more continuously chained carbon atoms. More preferably, it contains three or more continuously chained carbon atoms.

In the modifying agent, the upper limit of the continuously chained carbon number in its molecule is not specifically limited; for example, 30 or less is preferable and 20 or less is more preferable. The modifying agent whose continuously chained carbon number is 30 or less in its molecule is preferable because a mixing performance between the modified cationic polymer compound and the water absorbent resin particle is improved.

Examples of the modifying agents encompass: C2-C20 alkylene oxides, aromatic oxides, C2-C20 alkyl glycidyl ethers; silane coupling agent; C2-C20 fatty acids; C2-C20 hydroxyfatty acids, and the like. The carbon number of the alkylene oxide preferably ranges from 2 to 20, more preferably ranges from 2 to 4, and particularly preferably ranges from 2 to 3.

More specifically, examples of the mono epoxides encompass: ethylene oxide, propylene oxide, butylene oxide, cyclohexane oxide, styrene oxide, 1-phenylpropylene oxide, methylglycidyl ether, ethylglycidyl ether, glycidyl isopropyl ether, butyl glycidyl ether, 1-methoxy-2-methyl propylene oxide, allylglycidyl ether, 2-ethyloxyl glycidyl ether, phenyl glycidyl ether, phenyl (EO5) glycidyl ether, p-tert-butylphenyl glycidyl ether, lauryl alcohol (EO15) glycidyl ether, and the like; C11-C15 alcohol mixtures such as glycidyl ether, stearyl glycidyl ether, palmityl glycidyl ether, myristyl glycidyl ether, lauryl glycidyl ether, capryl glycidyl ether, caproyl glycidyl ether, and the like.

More specifically, examples of the silane coupling agents encompass: 2-(3,4-epoxy cyclohexyl)ethyltrimethoxysilane, 3-glycidyloxypropyl(dimethoxy)methylsilane, 3-glycidyloxypropyl trimethoxysilane, diethoxy(3-glycidyloxypropyl)methylsilane, 3-glycidoxypropyl trimethoxysilane, and the like.

The fatty acid may be a saturated fatty acid or an unsaturated fatty acid. Examples of the saturated fatty acids encompass: acetic acid, propionic acid, butyric acid, valeric acid, hexane acid, heptane acid, octane acid, nonane acid, decane acid (capric acid), undecanoic acid, dodecanoic acid (lauric acid), tridecane acid, tetradecane acid (myristic acid), pentadecane acid, hexadecane acid (palmitic acid), heptadecane acid (margarin acid), octadecane acid (stearic acid), nonadecane acid (tuberculostearic acid), icosane acid (arachic acid), docosanoic acid (behenic acid), tetradocosane acid (lignoceric acid), hexadocosane acid (cerotic acid), octadocosane acid (montanic acid, melissic acid), and the like. Examples of unsaturated fatty acids encompass: 9-hexadecene acid (palmitoylate acid), cis-9-octadecene acid (olein acid), 11-octadecene acid (vaccenic acid), cis,cis-9,12-octadecadiene acid (linoleic acid), 9,12,15-octadecatrienoic acid ((9,12,15)-linoleic acid), 6,9,12-octadecatrienoic acid ((6,9,12)-linoleic acid), 9,11,13-octadecatrienoic acid (elestearic acid), 8,11-icosadiene acid, 5,8,11-icosatriene acid, 5,8,11,14-icosa tetraenoic acid (arachidonic acid), cis-15-tetradocosanoic acid (nervonic acid), crotonic acid, myristoleic acid, elaidic acid, gadoleic acid, erucic acid, stearidonic acid, eicosapentaenoic acid, clupanodonic acid, docosahexaenoic acid, and the like. The fatty acid may have a straight- or branched-chain structure. Above all, the straight chain structure fatty acid is more preferable. As a result, hydrophobic interaction is caused between hydrophobic group, which is insoluble in water, of the organic acid and/or salt thereof in adjacent water absorbent resin particles. Consequently, hydrophobic group gather together and become stable between water absorbent resin particles. Therefore, it is considered that a stable space between water absorbent resin particles can be obtained, thereby improving in the liquid permeability.

The fatty acid is not specifically limited as long as continuously chained carbon number in its molecule is two or more and is preferably three or more.

The hydroxyfatty acid is not specifically limited. Examples of the hydroxyfatty acids encompass: recinoleic acid, ricinolein acid, 12-hydroxystearic acid, oxystearic acid, condensed ricinus fatty acid, hydrogenerated condensed ricinus fatty acid, malic acid, lactic acid, citric acid, salicylic acid, glycolic acid, gallic acid, 2-hydroxybutyric acid, tartaric acid, parahydroxybenzonic acid, 3-hydroxypropionic acid, and the like.

In addition, anisic acid, benzonic acid, glyoxylic acid, glutaric acid, succinic acid, fumaric acid, malonic acid, imidino acetic acid, isethionic acid, adipic acid, oxalic acid, gluconic acid, sorbic acid, and the like can be preferably used as the modifying agent.

The modifying agent may be used solely or two or more of them may be used in combination.

Examples of particularly preferable modifying agents encompass: propylene oxide, styrene oxide, butyl glycidyl ether, ethylene oxide, C12-C17 alkyl glycidyl ether, C2-C17 fatty acid, lactic acid, and the like. Among them, propylene oxide or propionic acid is most preferably used because a water absorbing agent to be obtained by using this modifying agent is excellent in liquid permeability.

Further, the modified cationic polymer compound may contain a primary amino group and/or a secondary amino group. As for the modified cationic polymer compound, it is preferable that all of the primary amino group and/or all of the secondary amino group in a cationic polymer compound as a precursor do not react with the modifying agent, and some of the primary amino group and/or the secondary amino group still remains unreacted with the modifying agent. Alternatively, it is also possible that all of the primary amino group and/or all of the secondary amino group in a cationic polymer compound as a precursor may react with the modifying agent, and some of the secondary amino group still remains. This allows obtaining an effect of outstandingly improving the liquid permeability.

It is not clear why the modified cationic polymer compound containing the primary amino group and/or the secondary amino group has an excellent effect in improving the liquid permeability. The remaining primary amino group and/or the secondary amino group increase biding power of water absorbent resin particles and the modified cationic polymer compound. This is considered allowing the modified cationic polymer compound to stably exist between the water absorbent resin particles and to exert effects on the water absorbent resin particles.

A ratio of the primary amino group and/or the secondary amino group reacting with the modifying agent relative to entire nitrogen atoms of the cationic polymer compound preferably ranges from 5 to 90 mol %, more preferably ranges from 10 to 80 mol %, and further preferably ranges from 20 to 70 mol %.

It is preferable that the ratio of the primary amino group and/or the secondary amino group reacting with the modifying anent relative to entire nitrogen atoms of the cationic polymer compound is 5% or more, because a balance between CRC and SFC is excellent. Also, it is preferable that a ratio of the primary amino group and/or the secondary amino group reacting with the modifying agent relative to entire nitrogen atoms of the cationic polymer compound is 90% or less, because a balance between CRC and SFC is excellent. The ratio of the primary amino group and/or the secondary amino group reacting with the modifying agent relative to entire nitrogen atoms of the cationic polymer compound can be measured by known methods such as an NMR, an IR, and the like.

Further, it is more preferable that a bond formed by the reaction between the modifying agent and the cationic polymer compound having the primary amino group and/or the secondary amino group is not an amidic bond, in view of obtaining a water absorbing agent which is excellent in a balance between a centrifugal retentive capacity (CRC) and a saline flow conductivity (SFC).

A cationic value of the modified cationic polymer compound preferably ranges from 1 to 23 mmol/g, more preferably ranges from 2 to 20 mmol/g, and further preferably ranges from 3 to 18 mmol/g. It is preferable that a cationic value of the modified cationic polymer compound is 1 mmol/g or more because a balance between CRC and SFC is excellent. Further, it is preferable that a cationic value of the modified cationic polymer compound is 23 mmol/g or less because a balance between CRC and SFC is excellent.

A method for reacting the cationic polymer compound with a modifying agent is not specifically limited. A method for adding and mixing the cationic polymer compound and a modifying agent is exemplified. In adding and mixing the cationic polymer compound and a modifying agent, it is preferable that the cationic polymer compound and a modifying agent are added and mixed together in liquid form. Further, a mixing temperature may be changed depending on a cationic polymer compound and a modifying agent as appropriate. Normally, the mixing temperature ranges from 30° C. to 80° C. Also, a mixing period is not specifically limited; however, it ranges from 1 minute to 1 hour.

As described above, a modified cationic polymer compound used in the present invention is obtained by reacting, with a modifying agent, a cationic polymer compound containing the primary amino group and/or the secondary amino group. The modified cationic polymer compound may be a copolymer containing a primary amino group and/or a secondary amino group in its main chain and a hydrocarbon group whose carbon number of side chain is two or more.

In the present invention, a polymer compound, which contains a primary amino group and/or a secondary amino group in a side chain, and a hydride group whose carbon number of side chain is 2 or more, may be used instead of the modified cationic polymer compound.

The polymer compound can be obtained, e.g., as a copolymer of main chain vinylamine and C2 or more (meta) acrylic acid ester, and more preferably, e.g., (i) a copolymer of acrylicamine and (meta) acrylic acid ester, (ii) a copolymer of N-vinylalkylamides such as N-vinylformamide, N-vinylacetamide, N-vinylethylamide, N-vinylpropylamide; and (meta) acrylic acid ester, and (iii) a copolymer of diallyl-dialkylamineamine and (meta) acrylic acid ester.

(3) Other Additives

In addition to the water absorbent resin particles and the modified cationic polymer compound in the water absorbing agent of the present invention, water is normally contained as a main component. Furthermore, other additives are used as necessary. Examples of other additives that can be used in the present invention include water-soluble polyvalent metal salt, water-insoluble inorganic fine particles, a water-soluble polymer such as polyethylene glycol, a surfactant, and a polymer emulsion.

Examples of the water-soluble polyvalent metal salt encompass aluminum chloride, polyaluminum chloride, aluminum sulfate, aluminum nitrate, bis aluminum potassium sulfate, bis aluminum sodium sulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate, ammonium zirconium carbonate, potassium zirconium carbonate, and sodium zirconium carbonate. These water-soluble polyvalent metal salts can be preferably used. From a viewpoint of solubility in an aqueous liquid that is absorbed in the water absorbing agent, more preferably, the water-soluble polyvalent metal salt contains crystalline water. These water-soluble polyvalent metal salts may be used solely or in combination of two or more of them. Aluminum sulfate can be used most preferably among others.

The water-soluble polyvalent metal salt content relative to the entire water absorbing agent is preferably in a range of 0 mass % to 5 mass %, more preferably in a range of 0.001 mass % to 5 mass %, and most preferably in a range of 0.01 mass % to 1 mass %.

Adding the water-soluble polyvalent metal salt within any one of the ranges further improves the centrifugal retention capacity (CRC) and saline flow conductivity (SFC) of the water absorbing agent.

Examples of the water-insoluble inorganic fine particles encompass: mineral produce such as talc, kaolin, fuller's earth, bentonite, activated earth, barite, natural asphaltum, a strontium ore, ilmenite, and pearlite; polyvalent metal oxide and polyvalent metal hydroxide; hydrophilic amorphous silica (e.g., ReolosilQS-20 (dry method, produced by Tokuyama Corporation), and Sipernat22S and Sipernat2200 (precipitation method, produced by Degussa Corporation)); and oxide complexes such as a complex of silicon oxide, aluminum oxide, and magnesium oxide (e.g., Attagel #50, produced by Engelhard Corporation), a complex of silicon oxide and aluminum oxide, and a complex of silicon oxide and magnesium oxide. As the water-insoluble inorganic fine particles, hydrophilic amorphous silica can be used most preferably among others.

The water-insoluble inorganic fine particle content relative to the entire water absorbing agent is preferably in a range of 0 mass % to 5 mass %, more preferably in a range of 0.01 mass % to 1 mass %, and most preferably in a range of 0.1 mass % to 0.5 mass %.

Adding the water-insoluble inorganic fine particles within any one of the ranges further improves a handling property (fluidity) and SFC of the water absorbing agent.

(4) Water Absorbing Agent

A water absorbing agent of the present invention is a water absorbing agent including water absorbent resin particles, wherein a modified cationic polymer compound exists on a surface of each of the water absorbent resin particles. It should be noted that because the modified cationic polymer compound was explained in (2), and the water absorbent resin particles were explained in (1), they are not explained repeatedly.

More preferably, the water absorbing agent of the present invention is obtained by polymerizing a water-soluble unsaturated monomer, has an internally crosslinked structure, and includes surface crosslinked water absorbent resin particles and the modified cationic polymer compound, and it is preferable that the modified cationic polymer compound exists between the water absorbing resin particles and/or on a surface of each of the water absorbent resin particles at the time of water absorption. This makes it possible to increase the CRC and to obtain liquid permeability-improving effect which cannot be obtained in conventional arts.

Further, each of the water absorbent resin particles on which surface the modified cationic polymer compound exists has a mass median particle size of preferably 100 μm or more and 600 μm or less, more preferably 200 μm or more and 500 μm or less, still more preferably 300 μm or more and 400 μm or less. When the mass median particle size exceeds this range, there is a case where the liquid permeability declines and the speed of water absorption into the water absorbing agent drops. That is, an absorption rate deteriorates. This may result in problems such as a liquid leakage or the like when used in a disposable diaper.

The water absorbing agent including the water absorbent resin particles of 175 μm or more and 710 μm or less is preferably 50 mass %, and preferably 80 mass %, the modified cationic polymer compound existing on a surface of each of the water absorbent resin particles.

Further, in the water absorbing agent, among the water absorbent resin particles on which surface the modified cationic polymer compound exists, particles which can pass through a sieve having a mesh size of 150 μm is preferably 5 mass % or less, more preferably 3 mass % or less, and most preferably 1 mass % or less. When the water absorbent resin particles which can pass through a sieve having a mesh size of 150 μm is more than 5 mass %, problems of safety and hygiene are caused due to scattering of the particles at the time of manufacturing a water absorbing agent. Further, there is a case where properties of the obtained water absorbing agent deteriorate.

Further, in the water absorbing agent, in each of the water absorbent resin particles on which surface the modified cationic polymer compound exists, a logarithmic standard deviation ($\sigma\zeta$) of a particle size distribution preferably is 0.20 or more and 0.50 or less, more preferably 0.30 or more and 0.40 or less. When the mass median particle size exceeds this range, there is a case where the liquid permeability declines and the speed of water absorption into the water absorbing agent drops.

In the water absorbing agent, its CRC is preferably 5 (g/g) or more, more preferably 15 (g/g) or more, still more preferably 25 (g/g) or more. An upper limit of the CRC is not limited in particular, but is preferably 60 (g/g) or less, more preferably 50 (g/g) or less, still more preferably 40 (g/g) or less. When the CRC is less than 5 (g/g), an amount of water absorption is too small. Therefore, the water absorbing agent having the CRC of less than 5 (g/g) cannot be suitably used in a sanitary material such as a disposable diaper. Further, when the centrifuge retention capacity (CRC) is more than 60 (g/g), it may be impossible to obtain a water absorbing agent excellent in speed of the water absorption into an absorbing material when used in the absorbing material.

In the water absorbing agent of the present invention, the saline flow conductivity (SFC) is preferably 30 ($10^{-7} \cdot cm^3 \cdot s \cdot g^{-1}$) or more, more preferably 50 ($10^{-7} \cdot cm^3 \cdot s \cdot g^{-1}$) or more, further preferably 100 ($10^{-7} \cdot cm^3 \cdot s \cdot g^{-1}$) or more, further more preferably 150 ($10^{-7} \cdot cm^3 \cdot s \cdot g^{-1}$) or more, particularly preferably 170 ($10^{-7} \cdot cm^3 \cdot s \cdot g^{-1}$) or more, most preferably 200 ($10^{-7} \cdot cm^3 \cdot s \cdot g^{-1}$) or more. When the SFC is less than 30 ($10^{-7} \cdot cm^3 \cdot s \cdot g^{-1}$), it may be impossible to obtain a water absorbing agent excellent in speed of the water absorption into an absorbing material when used in the absorbing material. An upper limit of the SFC is not limited in particular, but is preferably 3000 ($10^{-7} \cdot cm^3 \cdot s \cdot g^{-1}$) or less. When the SFC exceeds this upper limit, the problems mentioned in the section of the water absorbent resin particles may be caused.

In the water absorbing agent of the present invention, an absorbency against pressure (AAP) is preferably 8 (g/g) or more, more preferably 16 (g/g) or more, still more preferably 20 (g/g) or more where the pressure is 4.83 kPa. An upper limit of the AAP is not limited in particular, but is preferably 30 (g/g) or less. When the absorbency against pressure (AAP)

is less than 8 (g/g) where the pressure is 4.83 kPa, it may be impossible to obtain a water absorbing agent having a small amount of liquid flowing back (so-called re-wet) when a pressure is applied to an absorbing material.

In the water absorbing agent of the present invention, a contact angle is preferably 0° or more and 90° or less, more preferably 70° or less, still more preferably 50° or less, particularly preferably 30° or less when a droplet of 0.9 mass % sodium chloride aqueous solution is dropped. When the contact angle is 90° or less, a hydrophilic property is high and a liquid diffusing property is excellent when used in an absorbing material. Therefore, an absorbing area of the absorbing material becomes large, and property of the absorbing material is improved. Thus, such arrangement is preferable.

The water absorbing agent has a water-soluble content of preferably 35 mass % or less, more preferably 25 mass % or less, still more preferably 15 mass % or less. In case where the water-soluble content exceeds 35 mass %, its gel strength may be low and its liquid permeability may be low. Further, in case where the water absorbing agent is used in a disposable diaper for an extended period of time, the CRC, the AAP and the like may drop as time elapses.

Further, the water absorbing agent of the present invention is preferably has the hydrophilic property. In order that the water absorbing agent may have the hydrophilic property, it is possible to suitably use conventionally known methods such as a method in which a water absorbent resin containing, at least on its surface, quadrivalent polyol or polyol of a greater valency is used (WO2005/044915), a method in which inorganic fine particles are added on a water absorbent resin and UV light is irradiated on the water absorbent resin (Japanese Unexamined Patent Publication No. 2006-233008), a method in which a water absorbing agent composition including water-insoluble inorganic fine particles and fulfilling specific conditions is used (Japanese Patent Application No. 2007-504791), a method in which a water absorbent resin including a water-soluble polyvalent metal salt and a urea derivative is used (U.S. Patent Application Publication No. 2005-0288182), and a method in which hydrophilic inorganic fine particles are added (Japanese Patent Application No. 2006-188668).

(5) Method for Producing a Water Absorbing Agent

The present invention encompasses a method for producing a water absorbing agent including water absorbent resin particles and the modified cationic polymer compound. More specifically, the present invention encompasses a method for producing a water absorbing agent including water absorbent resin particles, wherein a modified cationic polymer compound exists on a surface of each of the water absorbent resin particles. The method according to the present invention for producing the water absorbing agent only needs to include at least a mixing step of mixing the water absorbent resin particles and the modified cationic polymer compound with one another. Thus, it is possible to provide a water absorbing agent which is excellent in a balance between a CRC and an SFC.

In the present invention, the mixing step of mixing the water absorbent resin particles and the modified cationic polymer compound with each other is not limited to any particular method, but may use any one of the following methods: (i) a method for mixing the water absorbent resin particles with a solution or a dispersion solution each of which includes the modified cationic polymer compound; (ii) a method for spraying, onto the water absorbent resin particles, either of the solution or the dispersion solution, and for mixing the resultant; and (iii) a method for directly adding the modified cationic polymer compound to the water absorbent resin particles, for adding, as needed, water, a solvent, a dispersion solvent, or the like thereto, and for mixing the resultant.

In the method according to the present invention for producing the water absorbing agent, particularly, it is more preferable that a solution or a dispersion solution of the modified cationic polymer compound is mixed with the water absorbent resin particles. This is preferable because this improves mixing property.

It is further preferable to arrange the method according to the present invention for producing the water absorbing agent so that a solution, an emulsification solution, or a suspension solution of the modified cationic polymer compound is mixed with the water absorbent resin particles.

In a case where a solution of the modified cationic polymer compound is mixed with the water absorbent resin particles, a solvent to be used is not limited to any particular kind, but may preferably be, for example, water; an alcohol such as ethanol and methanol; or polyethylene glycol. Particularly, it is the most preferable to use water. Similarly, it is the most preferable to use a mixture solvent obtained by mixing together water and a water-soluble organic solvent (e.g., an alcohol such as methanol and isopropyl alcohol; polyvalent alcohol such as propylene glycol; and 1,4-dioxiane). Also, it is preferable that a concentration of the modified cationic polymer compound in the solution is at least 10 mass % but 100 mass % or less, more preferably at least 30 mass % but 100 mass % or less.

In a case where a suspension solution of the modified cationic polymer compound is mixed with the water absorbent resin particles, a dispersion solvent to be used is not limited to any particular kind, but may preferably be, for example, water; an alcohol such as ethanol and methanol; or polyethylene glycol. Particularly, it is the most preferable to use water. Similarly, it is the most preferable to use a mixture solvent obtained by mixing together water and a water-soluble organic solvent (e.g., an alcohol such as methanol and isopropyl alcohol; polyvalent alcohol such as propylene glycol; and 1,4-dioxiane). Also, it is preferable that a concentration of the modified cationic polymer compound in the dispersion solution is at least 10 mass % but 100 mass % or less, more preferably at least 30 mass % but 100 mass % or less. Further, a dispersion agent such as water-soluble polymer and surfactant may be added thereto.

As well as the solution or the suspension solution, an emulsification solution of the modified cationic polymer compound (including an emulsification agent in, for example, water) may be mixed with the water absorbent resin particles. In this case, a dispersion solvent to be used is not limited to any particular kind, but may preferable be, for example, water. The emulsification agent is not limited to any particular kind, but may be a nonionic surfactant, a cationic surfactant, or the like. Also, it is preferable that a concentration of the modified cationic polymer compound in the emulsification solution is at least 10 mass % but 90 mass % or less, more preferably at least 30 mass % but 90 mass % or less.

It is further preferable to arrange the method according to the present invention for producing the water absorbing agent so that an aqueous solution of the modified cationic polymer compound is mixed with the water absorbent resin particles. Also, it is preferable that a concentration of the modified cationic polymer compound in the aqueous solution is at least 10 mass % but 90 mass % or less, more preferably at least 30 mass % but 90 mass % or less.

Also, it is not particularly limited in which timing the foregoing mixing step is carried out. It is preferable that the water absorbent resin particles used in the present invention are the ones which have been crosslinked on its shallow surface. Therefore, it is preferable that the method according to the present invention for producing the water absorbing agent further includes a surface cross-linking step of cross-linking, by using an surface cross-linking agent, the surface of each of the water absorbent resin particles. Also, it is preferable that the mixing step is carried out during and/or after the surface cross-linking step.

The timing during and/or after the surface cross-linking step, in which timing the mixing step is carried out, may be: a timing at the point when the water absorbent resin particles are mixed with the surface cross-linking agent; a timing during a mixture of the water absorbent resin particles and the surface cross-linking agent is being heated; a timing immediately after the heating of the mixture of the water absorbent resin particles and the surface cross-linking agent; a timing after cooling of the water absorbent resin particles obtained by heating the mixture of the water absorbent resin particles and the surface cross-linking agent; or a plurality of timings described above.

Particularly, in view of a purpose of attaining a high CRC and a more excellent liquid permeability improving effect, it is preferable to carry out the mixing step after the surface cross-linking step. For example, it is more preferable to carry out the mixing step immediately after the heating of the mixture of the water absorbent resin particles and the surface cross-linking agent or after cooling of the water absorbent resin particles obtained by heating the mixture of the water absorbent resin particles and the surface cross-linking agent. Further, it is particularly preferable to carry out the mixing step after the cooling of the water absorbent resin particles obtained by heating the mixture of the water absorbent resin particles and the surface cross-linking agent.

Also, it is preferable that the water absorbent resin particles used in the mixing step are the ones which have been heated to a temperature from 30° C. to 80° C., more preferably from 50° C. to 70° C. It is preferable that the water absorbent resin particles used in the mixing step are at a temperature of 30° C. or more because such water absorbent resin particles have improved handlability after mixing. Also, it is preferable that the water absorbent resin particles used in the mixing step are at a temperature of 80° C. or less because such water absorbent resin particles can prevent themselves from being colored or being amidated because of heat.

Also, the mixing step may further include a step for adding an additive such as the foregoing water-soluble polyvalent metal salt and/or water-insoluble inorganic fine particles. In a case where such an additive is added, the method for adding it is not limited to any particular method, but may be: a method for mixing a solution or a dispersion solution each of which includes the additive with the water absorbent resin particles or a mixture of the water absorbent resin particles and the modified cationic polymer compound; a method for spraying either of the solution or the dispersion solution each of which includes the additive and for mixing the resultant; a method for directly adding the additive, for adding, as needed, water, a solvent, a dispersion solvent, or the like, and for mixing the resultant.

Also, it is not particularly limited when to add the additive. The additive may be added at the point when the modified cationic polymer compound is added. Also, after the water absorbent resin particles and the modified cationic polymer compound are mixed together, the additive may be added to the mixture thus obtained. Among these, in view of a purpose for improving handlability of a water absorbing agent and improving an SFC, it is more preferable that the additive is added after the water absorbent resin particles and the modified cationic polymer compound are mixed together.

Also, in the mixing step, a concrete method for mixing the water absorbent resin particles, the modified cationic polymer compound, and, as needed, another additive described above with one another is not particularly limited, but may use any known stirring device. Examples of the stirring device preferably used encompass: a cylindrical mixer; a screw type mixer; a screw type extruder; Turbulizer; a Nauter mixer; a V-type mixer; a double-arm kneader; a fluidization mixer; an air mixer; a rotating disc mixer; a roll mixer; a tumbling mixer; a Loedige mixer; a puddle blender; a ribbon mixer, a rotary blender; a jar tumbler; a Plaujer mixer; and a mortar mixer. Further, the stirring device may include: a heating device for heating a mixture of the water absorbent resin particles, the modified cationic polymer compound, and, as needed, another additive as described above; or a cooling device for cooling the mixture heated by the heating device. Time any one of the stirring devices takes to carry out a stirring process is not particularly limited, but may preferably be 60 minutes or less, more preferably 30 minutes or less.

Also, it is preferable that the mixture thus obtained is dried after the mixing step. The drying temperature is at least 40° C. but less than 100° C. for a period of 50% or more of the whole time taken in the drying step, more preferably for a period of substantially all of the whole time taken in the drying step. Carrying out the drying process at such a temperature does not give damage due to heat to the water absorbing agent. Therefore, properties of the water absorbing agent thus obtained are not affected in an adverse way. A drying temperature is determined in accordance with a temperature of a heating medium. However, it is impossible to determine the drying temperature in accordance with a heating medium, for example, in a case of microwave. In such a case, the drying temperature is determined in accordance with a temperature of material. A drying method is not particularly limited, but only needs to have a drying temperature within the above-mentioned range. The drying method may preferably use hot-air drying, windless drying, vacuum drying, infrared-ray drying, microwave drying, or the like.

The drying temperature more preferably ranges from 40° C. to 100° C., further preferably from 50° C. to 90° C. During the drying step, a temperature may be maintained at a certain value or may be changed. However, it is preferable that the temperature is substantially maintained within the above-mentioned range throughout the drying step.

Drying time depends on the surface area of the water absorbing agent, the water absorption coefficient, and the type of the dryer. The drying time is selected appropriately so that a target water absorption coefficient is obtained. The drying time normally ranges from 10 minutes to 120 minutes, more preferably ranges from 20 minutes to 90 minutes, further preferably from 30 minutes to 60 minutes. If the drying time is less than 10 minutes, there is a possibility that the water absorbing agent is not dried sufficiently and does not have sufficient handlability. Also, if the drying time is 120 minutes or more, the following possibility may be considered: the water absorbing agent is damaged and this causes an increase in the amount of water-soluble content, so that physical properties of the water absorbing agent are not improved.

In the method for producing the water absorbing agent, it is more preferable to mix the modified cationic polymer compound and the water absorbent resin particles with each other, after the water absorbent resin particles are subjected to mechanical damage so as to have an irregularly-pulverized shape. The water absorbent resin particles having the irregularly-pulverized shape can efficiently contain, on its surface, the modified cationic polymer compound. Thus, it is possible to improve properties of the water absorbing agent thus obtained.

The "mechanical damage" herein means that the water absorbent resin particles are collided with a piece of glass or metal so that the water absorbent resin particles are subjected to a physical shock.

A method for giving mechanical damage to the water absorbent resin particles is not particularly limited, but only needs to be capable of giving a shock to the water absorbent resin particles. Examples of this method encompass a method (paint shaker test, which is described later) for shaking a glass container containing water absorbent resin particles and glass beads so that the water absorbent resin particles are subjected to mechanical damage. Another method for giving mechanical damage to the water absorbent resin particles may be: a method (ball mill) for rotating a cylindrical container containing water absorbent resin particles and a ball or the like; a method for stirring water absorbent resin particles in a stirring device having a stirring wing; a method for passing water absorbent resin particles through a paddle dryer (a heating device or a cooling device each of which has a paddle wing); a method for crushing water absorbent resin particles by means of a crushing device; a method for conveying water absorbent resin particles by air stream; or a method for causing a collision or friction between one particle of a water absorbing resin particles and another particle of the water absorbing resin particles.

(6) Water Absorbing Material

The water absorbing material of the present invention includes the water absorbing agent of the present invention. A combination of the water absorbing material of the present invention and an appropriate material can be used as, for example, a water absorbing material suitable as a water absorbing layer of the sanitary material. The following explains the water absorbing material according to the present invention.

In the present invention, a water absorbing material is a material made of the water absorbing agent and other materials, and formed in a shape. The water absorbing material is used in a sanitary material for absorbing blood, bodily fluid, urine, and the like. Examples of the sanitary materials may encompass a disposable diaper, a sanitary napkin, an incontinence pad, a medical pad, and the like. Other material used for the water absorbing material may encompass a cellulose fiber. A specific example of such a cellulose fiber encompasses, for example, a wood pulp fiber such as a mechanical pulp made from wood, a chemical pulp, a semi-chemical pulp, and a dissolved pulp, an artificial cellulose fiber such as rayon and acetate, and the like. A more preferable cellulose fiber is a wood pulp fiber. These cellulose fibers may partially contain a synthesized fiber such as a nylon and a polyester. When the water absorbing agent of the present invention is used as a part of the water absorbing material, content of the water absorbing agent in the water absorbing material is preferably 20 mass % or more, more preferably 30 mass % or more, and most preferably 40 mass % or more. If the water absorbing agent of the present invention in the water absorbing material have weight of less than 20 mass %, there is a risk that a sufficient absorption effect can not be obtained.

For obtaining the water-absorbing material by using the water absorbing agent of the present invention and the cellulose fibers, for example, the following conventional methods may be adopted as appropriate: a method for obtaining the water absorbing material by dispersing the water absorbing agent on a paper sheet or mat made of the cellulose fibers, and if necessary, by sandwiching the water absorbing agent between the paper sheets or mats; a method for obtaining the water absorbing material by blending the cellulose fibers and the water absorbing agent uniformly; and the like methods. A more preferable method encompasses a method for obtaining the water-absorbing material by dry-mixing the water absorbing agent and the cellulose fibers to obtain a mixture of them, and then compressing the mixture. This method significantly prevents fall-out of the water absorbing agent from the cellulose fibers. It is preferable that the compression be carried out while heating the mixture. The heating is carried out, for example, in a range of 50° C. to 200° C.

The water absorbing agent according to the present invention is excellent in solid state properties. Thus, when using the water absorbing agent in the water absorbing material, it is possible to obtain the highly excellent water absorbing material that quickly absorbs liquid and leaves less residual liquid in a surface layer of the water absorbing material.

These excellent water absorbing properties allow the water absorbing agent of the present invention to be used as a water absorbing retaining agent for various usages, for example: a water absorbing retaining agent for absorbing goods such as a disposable diaper, a sanitary napkin, an incontinence pad, a medical pad, and the like; a water retaining agent for agriculture/horticulture, such as a substitute for sphagnum moss, a soil conditioner, a water retaining agent, an agrichemical effect keeping agent, and the like; a water retaining agent for construction/civil engineering usages, such as a dew condensation preventing agent for an interior wall material, an additive for cement, and the like; a release controlling agent, a cold insulating agent, a disposable body warmer, a coagulant for polluted mod, a freshness preserving agent for a food, an ion exchanging column material, a dehydrating agent for sludge/oil, a desiccant agent, a humidity conditioning agent, and the like. Particularly, the water absorbing agent of the present invention is suitable for use in a sanitary material (such as a disposable diaper, a sanitary napkin, and the like) for absorbing excrement, urine, and/or blood.

In a case where the water absorbing material according to the present invention is used in the sanitary material for the disposable diaper, the sanitary napkin, the incontinence pad, the medical pad, or the like, it is preferable that the water absorbing material is used in such an arrangement that includes (a) a liquid-permeable top sheet provided next to a body of a user, (b) a liquid-impermeable back sheet provided next to cloths of the user but far away from the body of the user, and (c) a water absorbing material provided between the top sheet and the back sheet. The water absorbing material may be multi-layered (two or more layers). Further, the water absorbing material may be used in combination with a pulp layer or the like.

(7) Water Absorbing Agent Containing Water Absorbing Resin Particles and the Cationic Polymer Compound Having a Cationic Value of from 1 to 22 mmol/g, and a Secondary Cationic Value of from 0.1 to 11 mmol/g.

Moreover, the preset invention encompasses a water absorbing agent which contains the water absorbing agent as its main component, and further a cationic polymer compound having a secondary amino group, wherein the cationic polymer compound has a cationic value of from 1 to 22 mmol/g, and a secondary cationic value of from 0.1 to 11 mmol/g.

The water absorbing agent in (7) is similar to the water absorbing agents described in (1) and (3) in terms of the water absorbing resin particle and the other additive. Therefore, the explanation thereon is not repeated here. Note that the wording "modified cationic polymer compound" in (1) and (3)

should be replaced with the wording "cationic polymer compound having a secondary amino group" in (7).

In the water absorbing agent in (7), the cationic polymer compound having the secondary amino group exists on the surface of the water absorbing resin particles. Note that the surface of the water absorbing resin particles is as described in (2).

The presence of the cationic polymer compound having the secondary amino group on the surface of the water absorbing resin particles makes it possible to attain high SFC in the water absorbing agent without reducing CRC thereof. In other words, this improves the liquid permeability of the water absorbing agent. In other words, it is possible to improve liquid permeability of the water absorbing agent. In order to improve the liquid permeability, the modified cationic polymer compound may exist on a part of the water absorbent resin particle which is exposed to outer air and/or within a tenth portion of the particle diameter (major axis) from the surface of the water absorbent resin particle. It is more preferable that the modified cationic polymer compound exists on a portion of the water absorbent resin particle which is exposed to outer air for improving properties of the water absorbing agent.

The cationic polymer compound having the secondary amino group has a cationic value of from 1 to 22 mmol/g, and a secondary cationic value of from 0.1 to 11 mmol/g. This makes it possible to attain the effect of the present invention that high SFC in the water absorbing agent can be attained without reducing CRC thereof.

The cationic polymer compound having the secondary amino group should have a cationic value of from 1 to 22 mmol/g. However, it is preferable that the cationic polymer compound having the secondary amino group has a cationic value of from 1 to 21 mmol/g. It is more preferable that the cationic polymer compound having the secondary amino group has a cationic value of from 2 to 20 mmol/g. The cationic polymer compound having the secondary amino group should have a secondary cationic value of from 0.1 to 11 mmol/g. However, it is preferable that the cationic polymer compound having the secondary amino group has a secondary cationic value of from 0.2 to 10 mmol/g. It is more preferable that the cationic polymer compound having the secondary amino group has a secondary cationic value of from 1 to 10 mmol/g.

In the cationic polymer compound having the secondary amino group, the ratio of the secondary amino group relative to the entire nitrogen atoms in the molecule is preferably in a range of from 5 to 100 mol %, more preferably in a range of from 25 to 100 mol %, and further preferably in a range of from 50 to 100 mol %. This makes it possible to attain the effect of the present invention that a high SFC can be attained in the water absorbing agent without reducing CRC thereof.

The cationic polymer compound having the secondary amino group may exist as a salt. Here, the salt of the secondary amino group is not particularly limited, provided that the salt is obtained by neutralizing the secondary amino group with an inorganic acid or organic salt. Examples of the inorganic acid salt encompass hydrochloride, sulfate, nitrate, etc. Moreover, the organic acid salt is not particularly limited, provided that the salt is a salt of an organic acid having one or less carbon atoms linked continuously. Examples of the organic acid salt is a salt of formic acid, etc.

Examples of the cationic polymer compound having the secondary amino group encompass a product of the reaction of the cationic polymer compound and the modifying agent as described in (2). More specifically, for example, modified polyethylene imine, modified polyvinylamine (the modified polyvinylamine may be expressed as hydrolyzed modified poly(N-vinylformamide) obtained by reacting hydrolyzed poly(N-vinylformamide) with the modifying agent), modified polyallylamine, modified polyamidine, etc.

The cationic polymer compound having the secondary amino group may be used solely, or two or more of the cationic polymer compounds may be used in combination.

For better improvement in the liquid permeability, the cationic polymer compound having the secondary amino group is preferably the modified polyethyleneimine, modified polyvinylamine, or the like. Moreover, the cationic polymer compound having the secondary amino group may be straight or branched.

The cationic polymer compound having the secondary amino group has a weight average molecular weight of preferably 5,000 or more, more preferably 10,000 or more, and further preferably 30,000 or more. With a weight average molecular weight of less than 5000, the cationic polymer compound having the secondary amino group would not provide the expected effect. There is no particular upper limit in the weight average molecular weight. However, it is preferable that the weight average molecular weight is 1,000,000 or less. It is more preferable that the weight average molecular weight is 500,000 or less.

With the cationic polymer compound having a weight average molecular weight not more than 1,000,000, the water absorbing agent will have low viscosity and be excellent in handleability and mixing property. The weight average molecular weight can be measured by a well-known method such as GPC, viscosity measurement, static scattering method, etc.

The water absorbing agent in (7) is preferably arranged such that the cationic polymer compound having the secondary amino group exists between the water resin particles and/or on the surface of the water resin particle when the water absorbing agent absorbs water. With this arrangement, the water absorbing agent can have a higher liquid permeability than ever, as well as the high CRC.

The water absorbing agent in (7) is similar to the water absorbing agent described in (4) in terms of the mass median particle size of the water absorbing resin particles on which the cationic polymer compound having the secondary amino group, the ratio of the water absorbing agent having particle sizes not less than 175 μm but not more than 710 μm, the ratio of particles passable through a mesh of 150 μm in mesh size, and logarithmic standard deviation of the particle size distribution ($\delta\zeta$). The water absorbing agent in (7) is also similar to the water absorbing agent described in (4) in terms of CRC, SFC, AAP, the contact angle against dropped liquid droplet of 0.9% saline, and water-soluble content.

Moreover, the present invention encompasses a method for producing the water absorbing agent in (7). The method for producing the water absorbing agent should comprise the step (i) of mixing the water absorbent resin particles with a cationic polymer compound, the cationic polymer compound being obtained by containing a secondary amino group, and having a cationic value of from 1 to 22 mmol/g, and a secondary cationic value of from 0.1 to 11 mmol/g. This makes it possible to produce a water absorbing agent having an excellent balance between CRC and SFC.

In the present invention, the mixing step of mixing the water absorbent resin particles and the cationic polymer compound having the secondary amino group, with each other is not limited to any particular method, but may use any one of the following methods: (i) a method for mixing the water absorbent resin particles with a solution or a dispersion solution each of which includes the cationic polymer compound;

(ii) a method for spraying, onto the water absorbent resin particles, either of the solution or the dispersion solution each of which includes the cationic polymer compound, and for mixing the resultant; and (iii) a method for directly adding the cationic polymer compound having the secondary amino group to the water absorbent resin particles, for adding, as needed, water, a solvent, a dispersion solvent, or the like thereto, and for mixing the resultant.

In the method according to the present invention for producing the water absorbing agent, particularly, it is more preferable that a solution or a dispersion solution of the cationic polymer compound is mixed with the water absorbent resin particles. This is preferable because this improves mixing property.

It is further preferable to arrange the method according to the present invention for producing the water absorbing agent so that a solution, an emulsification solution, or a suspension solution of the cationic polymer compound having the secondary amino group is mixed with the water absorbent resin particles.

Specific explanation on the method for producing the water absorbing agent in (7) is similar to that is (5), therefore is omitted here. Further, explanation on water absorbing material containing the water absorbing agent in (7) is similar to that in (6), therefore is omitted here. To read the explanation in (5) and (6) for understanding the method for producing the water absorbing agent in (7), the wording "modified cationic polymer compound" should be replaced with "cationic polymer compound having the secondary amino group".

EXAMPLES

Through the following Examples, the present invention is further described. However, the present invention is not limited to the following Examples. In the following examples, "part by weight" may be described, for convenience, as "part", and "litter" as "L". Further, "% by mass" may be described as "wt %".

Properties of a water absorbent resin, water absorbent resin particles, or a water absorbing agent were measured in the following measurement method. Without any special descriptions, the following measurement was conducted at room temperature (20 to 25° C.) and humidity of 50 RH %.

In a case of a water absorbing agent that has been used as a final product such as a sanitary material, the water absorbing agent absorbs moisture. In this case, the water absorbing agent may be appropriately separated from the final product and dried under low pressure and at low temperature (for example, dried under not more than 1 mmHg and at 60° C. for 12 hours), so that the resultant thus obtained may be measured. Further, each solid content of the water absorbing agents used in Examples and Comparative Examples was not less than 94 wt %. The following descriptions of measurement methods deal with measurements of the water absorbing agent as an example, but properties of water absorbent resin particles also can be measured in the same manner.

Moreover, a paint shaker test conducted in Reference Example 13 was carried out in the following manner.

<Centrifuge Retention Capacity (CRS)>

The centrifuge retention capacity (CRC) represents an absorption capacity at which 0.90 wt % of saline is absorbed for 30 minutes without load. The CRC is also referred to as absorption capacity without load.

Then, 0.200 g of water absorbing agent was evenly contained in a bag (85 mm×60 mm) made of a nonwoven fabric (manufactured by Nangoku Pulp Kogyo Co., Ltd., Heatron Paper: model type is GSP-22) and was heat-sealed. Then, the bag was soaked in an excessively large amount (generally, about 500 ml) of 0.90 wt % saline (sodium chloride aqueous solution) at room temperature, and was withdrawn 30 minutes later. By use of a centrifugal separator (manufactured by KOKUSAN corporation, centrifugal machine: model type is H-122), the bag was drained for three minutes at centrifugal force (250 G) described in edana ABSORBENCY II 441.1-99, and a weight $W_1$ (g) of the bag was measured. Further, the same operation was performed without using the water absorbing agent, and a weight $W_0$ (g) was measured. Then, from the weights $W_1$ and $W_0$, the centrifuge retention capacity (CRC) (g/g) was calculated according to the following equation.

Centrifuge Retention Capacity (CFC) (g/g)=($W_1$ (g)−$W_0$ (g))/weight (g) of water absorbing agent)−1

<Absorbency Against Pressure of 4.83 kPa (AAP)>

The absorbency against pressure (AAP) represents an absorption capacity at which 0.90 wt % of saline is absorbed for 60 minutes at 4.83 kPa. The AAP is also referred to as absorbency under a pressure of 4.83 kPa. FIG. 1 is a cross sectional view illustrating a measuring apparatus of AAP.

With the use of the measuring apparatus illustrated in FIG. 1, the absorbency against pressure (AAP) was measured. On a bottom of a plastic supporting cylinder 100 having a 60 mm internal diameter, a Stainless metal net 101 of 400 mesh (mesh size of 38 μm) was fusion-bonded. Then, under a condition of a room temperature (20° C. to 25° C.) and 50% RH humidity, 0.900 g of a water absorbing agent was evenly dispersed on the stainless metal net 101. Subsequently, a piston 103 and a load 104 were placed in this order on the water absorbing agent. External diameters of the piston 103 and the load 104 were slightly smaller than 60 mm which was the internal diameter of the supporting cylinder 100, so that there was no gap between the piston and the supporting cylinder, and upward and downward movements of the piston 103 and the load 104 would not be hampered. Note that, the piston 103 and the load 104 were so adjusted as to evenly apply a 4.83 kPa (0.7 psi) load onto the water absorbing agent as a test body 102. Then, a weight Wa (g) of the entire measuring apparatus 10 was measured.

Inside a petri dish 105 having a 150 mm diameter, a glass filter 106 (product of Sougo Rikagaku Glass Seisakusho Co., Ltd.; diameter of fine pores: 100 μm to 120 μm) having a 90 mm diameter was placed. Thereafter, 0.90 wt % saline 108 (at not less than 20° C. but not more than 25° C.) was added until it reached a level of an upper surface of the glass filter 106. Then, a piece of filter paper 107 (product of Advantec Toyo Kaisha, Ltd.; product name: JIS P3801, No. 2; thickness: 0.26 mm; diameter of retained particles: 5 μm) having a 90 mm diameter was placed thereon, so that an entire surface of the filter paper 107 was wetted. An excess of the 0.90 wt % saline 108 was removed.

A set of the measuring apparatus 10 was placed on the wet filter paper 107. Then, the water absorbing agent was made to absorb the solution for one hour under the load. One hour later, the set of the measuring apparatus 10 was lifted, and a weight Wb (g) thereof was measured. From the weights Wa and Wb, the absorbency against pressure of 4.83 kPa (AAP) (g/g) was calculated according to the following equation.

Absorbency against pressure of 4.83 kPa (AAP)=(Wb (g)−Wa (g))/weight (0.900 g) of water absorbing agent)

<Saline Flow Conductivity (SFC)>

Figure 2:
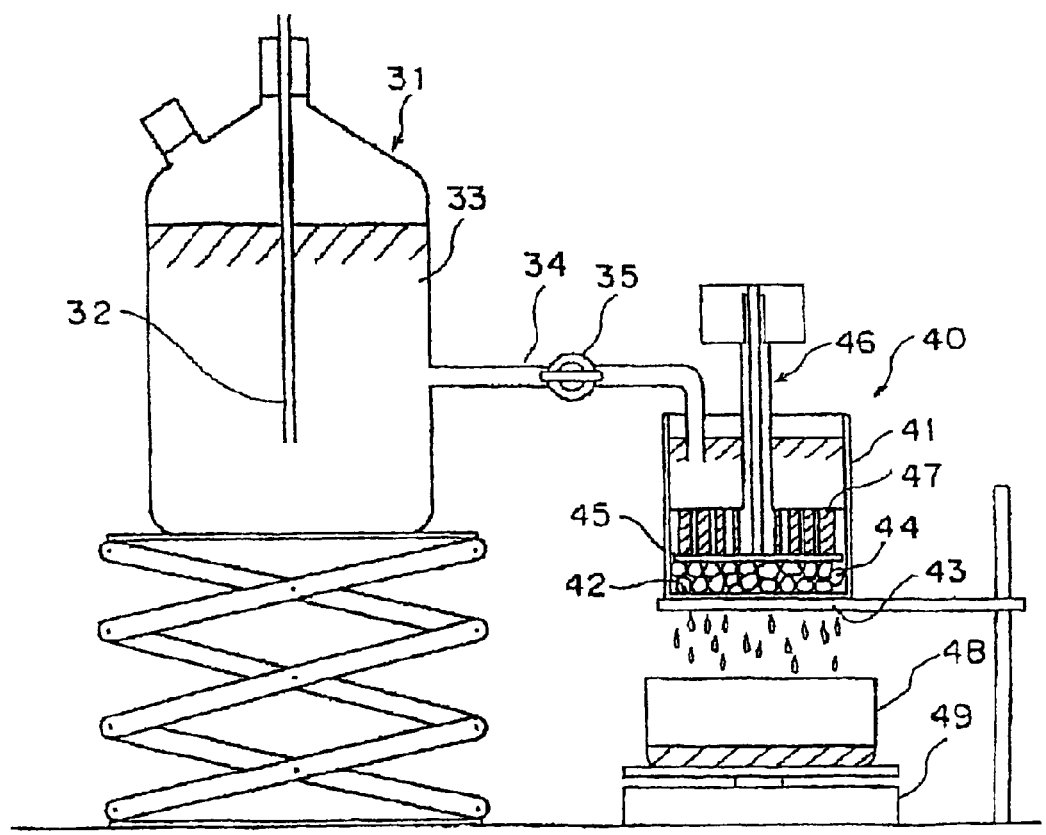
FIG. 2 is a schematic view illustrating a measuring apparatus of SFC, which was used in Examples.

The saline flow conductivity (SFC) is a value indicative of liquid permeability in a case where the water absorbing agent is swollen. As the value of SFC is higher, the liquid permeability is higher. In Examples, a test was carried out on the basis of an SFC test described in U.S. Pat. No. 5,849,405. FIG. 2 is a view schematically illustrating a measuring apparatus of SFC.

In the measurement apparatus illustrated in FIG. 2, a glass tube 32 was inserted into a tank 31, and a lower end of the glass tube 32 was disposed so that 0.69 wt % saline 33 was positioned 5 cm higher than a bottom of the swelling gel 44 in a cell 41. Further, the 0.69 wt % saline 33 contained in the tank 31 was supplied to the cell 41 via an L-shaped tube 34 with a cock. A collecting vessel 48 for collecting liquid having passed through a gel layer was disposed under the cell 41, and the collecting vessel 48 was placed on a pan scale 49. An inside diameter of the cell 41 was 6 cm, and No. 400 stainless metal net (38 μm in mesh) 42 was placed on a bottom of a lower portion of the cell 41. A hole 47 which allowed liquid to pass through was provided on a lower portion of a piston 46, and a glass filter 45 having high permeability was provided on the bottom thereof so that the water absorbing agent or the swelling gel did not enter into the hole 47. The cell 41 was placed on a table for the cell, and the table's surface which is in contact with the cell 41 was positioned on the stainless metal net 43 which did not prevent the liquid from passing through.

An artificial urine (1) was prepared by mixing 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, 0.15 g of diammonium hydrogen phosphate, and 994.25 g of pure water.

By use of the measurement apparatus 20 illustrated in FIG. 2, the water absorbing agent (0.900 g) evenly contained in a vessel 40 was swollen in the artificial urine (1) under a pressure of 2.07 kPa (0.3 psi) for 60 minutes, so as to obtain the gel 44, and a height of a gel layer of the gel 44 was recorded. Then, the 0.69 wt % saline 33 was made to flow from the tank 31 and to pass through the swelling gel layer at a constant hydrostatic pressure under the pressure of 2.07 kPa (0.3 psi). The SFC test was carried out at room temperature (not less than 20° C. but not more than 25° C.). By using a computer and a scale, an amount of liquid passing through the gel layer at intervals of 20 seconds was recorded for 10 minutes as a time function. A flow rate Fs(T) of the solution passing through the swelling gel 44 (mainly between particles thereof) was determined in terms of g/s by dividing an increasing weight (g) by an increasing time (s). A time in which a constant hydrostatic pressure and a stable flow rate had been obtained was set as "Ts", and only data obtained between "Ts" and a ten-minute interval was used to calculate the flow rate, the flow rate calculated between "Ts" and a ten-minute interval was used to calculate a value of Fs (T=0), i.e., a first flow rate of the solution passing through the gel layer. Fs (T=0) was calculated by extrapolating T=0 from a result obtained by approximating a function indicative of a relationship between Fs (T) and Time.

$$\text{Saline flow conductivity} = (Fs(t=0) \times Lo)/(\rho \times A \times \Delta P)$$

$$= (Fs(t=0) \times Lo)/139506$$

Here,
Fs (t=0): a flow rate represented by "g/s"
Lo: a height of the gel layer that is represented by "cm"
ρ: a density (1.003 g/cm$^3$) of NaCl solution A: an area (28.27 cm$^2$) on the upper side of the gel layer of the cell 41
ΔP: a hydrostatic pressure (4920 dyne/cm$^2$) exerted to the gel layer. Further, a unit of SFC value is $(10^{-7} \cdot \text{cm}^3 \cdot \text{s} \cdot \text{g}^{-1})$.

In a case where the hydrostatic pressure does not satisfy the above because the liquid passes through too fast, it is also possible to calculate SFC by changing the value ΔP to a value calculated from a height of the liquid level the saline.

<Mass Median Particle Size (D50) And Logarithmic Standard Deviation (σζ) of Particle Size Distribution>

Tests were carried out on the basis of mass median particle size (D50) test and logarithmic standard deviation (σζ) test described in International Publication No. 2004/69915 pamphlet.

<Ratio of Particles Having Particle Size that Allows the Particles to Pass Through Sieve with 150 μm in Mesh>

Classification was carried out in the same manner as the mass median particle size (D50) and the logarithmic standard deviation (σζ) of the particle size distribution, so that a ratio of particles (wt %) having a particle size that allowed the particles to pass through a sieve with 150 μm in mesh was calculated from an amount of particles that had passed through the sieve with 150 μm in mesh.

<Solid Content of Water Absorbing Agent>

A ratio of components that are not vaporized at 180° C. in the water absorbing agent is as follows. Further, its relation with moisture content is as follows.

Solid content (wt %)=100−moisture content (wt %)

The solid content was measured in the following manner.

About 1 g of a water absorbing agent (weight $W_1$) was measured and poured into an aluminum cup (weight $W_0$) having a bottom surface of about 5 cm in diameter, and left to stand for 3 hours in a calm dryer at 180° C. so that the water absorbing agent was dried. Thereafter, a weight ($W_2$) of the aluminum cup and the water absorbing agent thus dried was measured, and the solid content was calculated according to the following equation.

Solid content (wt %)=$((W_2-W_0)/W_1) \times 100$

<Amount of Water-Soluble Content (Water-Soluble Component)>

Into a 250 ml plastic container having a cover, 184.3 g of 0.90 wt % saline was measured and poured. Into the solution, 1.00 g of the water absorbing agent was added, and the plastic container with the solution and the water absorbing agent was stirred for 16 hours by rotating a stirrer, thereby extracting an extractable content from the resin. The extract solution was filtered through a piece of filter paper (product of Advantec Toyo Kaisha, Ltd.; product name: JIS P3801, No. 2; thickness: 0.26 mm; diameter of retained particles: 5 μm), thereby obtaining a filtrate. Then, 50.0 g of the filtrate was measured so as to be used as a measurement solution.

First, only the 0.90 wt % saline was titrated by using a 0.1N NaOH solution, until pH of the saline reached 10.

Thereafter, the saline was titrated by using a 0.1N HCl solution, until pH of the saline reached 2.7. In this way, blank titration amounts ([bNaOH] ml and [bHCl] ml) were measured.

The same operation was performed with respect to the measurement solution, thereby measuring titration amounts ([NaOH] ml and [HCl] ml).

Thereafter, for example, in a case of a water absorbing agent including a known amount of acrylic acid and its sodium salt as its main component, an amount of a water-soluble content in the water absorbing agent was calculated, in accordance with the following equation, from an average molecular weight of the monomer and the titration amounts obtained by the foregoing operation. In a case of a water absorbing agent including an unknown amount of acrylic acid and its sodium salt, an average molecular weight of the monomer was calculated by using a neutralization ratio calculated by titration.

Water-soluble content (wt %)=0.1×(average molecular weight)×184.3×100×([HCl]−[bHCl])/1000/1.0/50.0

Neutralization ratio (mol %)=(1−([NaOH]−[bNaOH])/([HCl]−[bHCl]))×100

<Cationic Value>

Firstly, 0.01 g of modified cationic polymer compound was measured and poured into a 1000 ml beaker, and 500 ml of 0.1 mol/l hydrochloric acid was added thereto. After the solution in the beaker was stirred for 10 minutes, 20 ml of the resultant solution was measured and poured into a beaker, and a few drops of toluidine blue indicator solution (product of Wako Junyaku Kogyo Co., Ltd.) was added thereto as an indicator. Then, 1/400 mol/l polyvinyl potassium sulfate standard solution (product of Wako Junyaku Kogyo Co., Ltd.) was added to the beaker little by little until color of the solution was changed from blue to purple. When an amount of the polyvinyl potassium sulfate standard solution thus dropped until the solution color was changed was represented by V ml, a cationic value was calculated according to the following equation.

Cationic value (mmol/g)=(V×(1/400))/(0.01×(20/500))

Contact Angle>

A double-sided adhesive tape was bonded onto an SUS plate, and a water absorbing agent was dispersed thereon. Then, the water absorbing agent that did not adhere to the double-sided tape was removed. In this way, a sample plate whose surface was covered with the water absorbing agent was obtained. Then, a contact angle when 0.90 wt % physiological saline came into contact with the sample plate was measured at 20° C. and 60% RH by a drop method with the use of a contact angle measuring apparatus (product of Kyowa Interface Science Co., Ltd., FACE CA-X). A contact angle measured one second after droplet of the 0.90 wt % physiological saline was dropped was measured five times per sample, and an average of the measurements was calculated as a contact angle of the water absorbing agent.

<Fixed Height Absorption (FHA)>

The fixed height absorption (FHA) was measured according to a method disclosed in US2005/000319A1. In the present invention, the measurement was carried out at height of 20 cm.

<Paint Shaker Test>

The paint shaker test (PS) was as follows. Firstly, 10 g of glass beads with 6 mm in diameter and 30 g of water absorbent resin or water absorbing agent were provided in a glass container with 6 cm in diameter and 11 cm in height, and the glass container was placed in a paint shaker (product of Toyo Seiki Seisaku-sho, Ltd., Product No. 488) and shaken at 800 cycle/min (CPM). Details of the apparatus are disclosed in Japanese Unexamined Patent Publication, Tokukaihei, No. 9-235378. A time for shaking was 30 minutes.

After the glass container was shaken, the glass beads were removed by use of a JIS standard sieve with 2 mm in mesh. In this way, the water absorbent resin particles or the water absorbing agent thus damaged were/was obtained.

<Coloring Evaluation with Respect to Water Absorbing Agent (Hunter's Lab Color System/L Value, a Value, b Value)>

The coloring of the water absorbing agent was evaluated by using a spectral colorimeter SZ-Σ 80 COLOR MEASURING SYSTEM (product of NIPPON DENSHOKU). A reflection measurement was selected as a preset condition of measurement, and an accessory powder-paste sample table having internal diameter of 30 mm and height of 12 mm was used. Further, a powder-paste standard rounded white plate No. 2, and 30 Φ floodlight pipe were used as a standard. About 5 g of water absorbing agent was provided in the built-in sample table (corresponding to about 60% of the built-in sample table).

Then, an L value (Lightness: lightness index), an a value (chromaticity), and a b value (chromaticity) in Hunter's Lab color system were measured by the spectral colorimeter at room temperature (from 20 to 25° C.) and humidity of 50 RH %. These values indicate "L value, a value, and b value before exposure".

Further, other object color YI (Yellow Index) or WB (White Balance) can be measured at the same time by using the same device and the same measuring method. As the WB is larger, or YI is smaller, the water absorbing agent is less colored and its color is closer to substantial whiteness.

Subsequently, about 5 g of the water absorbing agent was placed in the paste sample table, and the paste sample table containing the water absorbing agent was exposed for 7 days in a constant-temperature-and-moisture apparatus (product of TABAI ESPEC CORPORATION, PLATINOUS LUCIFFER, PL-2G) in which temperature had been adjusted to 70±1° C. and relative humidity had been adjusted to 65±1%. The exposure was a test for promoting coloring for 7 day. After the exposure, an L value (Lightness), an a value (chromaticity), and a b value (chromaticity) in Hunter's Lab color system were measured by the spectral colorimeter. The values thus measured indicate "L value, a value, and b value after 7-day exposure in atmosphere at 70±1° C. and 65±1% of relative humidity".

Reference Example 1

In a reactor formed by attaching a cover to a double-arm type stainless kneader having a capacity of 10 liters and equipped with two sigma type blades and a jacket, a reaction liquid was obtained by dissolving 434.0 g of acrylic acid, 4356.9 g of 37 wt % sodium acrylate aqueous solution, 660.1 g of pure water, and 9.69 g of polyethylene glycol diacrylate (average molecular weight is 523). Next, the reaction liquid was degassed for 20 minutes under an atmosphere of nitrogen gas. Continuously, 16.21 g of 20 wt % sodium persulfate aqueous solution and 23.16 g of 1 wt % L-ascorbic acid aqueous solution were added to the reaction liquid while being stirred, and then polymerization started after approximately 20 seconds. Then, the polymerization was carried out at a temperature in a range of 25° C. to 90° C. while the resultant gel was crushed. A hydrogel cross-linked polymer was taken out 30 minutes after the beginning of the polymerization. The time from when the polymerization started until when the reaction liquid reached the highest temperature was within 15 minutes. The obtained hydrogel (hydrogel cross-linked polymer) was pulverized so as to be approximately 5 mm or less in diameter.

The pulverized hydrogel cross-linked polymer was spread on a metal net of 50 mesh, and then hot-air dried at 185° C. for 45 minutes. The dried hydrogel was pulverized with a roller mill, and then classified with a JIS standard sieve having a mesh size of 710 μm. Particles passing through the JIS standard sieve were further classified with a JIS standard sieve having a mesh size of 175 μm. Microparticles passing through the JIS standard sieve having a mesh size of 175 μm were excluded, thereby obtaining an irregularly-pulverized water absorbent resin (A) having a mass median particle size (D50) of 350 μm and 0.33 log standard deviation (σξ) of particle-size distribution. The water absorbent resin (A) had a centrifugal retention capacity (CRC) of 34.0 (g/g), and included 9.0 wt % of water-soluble contents and 1.0 wt % of particles having a size with which the particles can pass through a sieve having a mesh size of 150 μm.

A surface-cross-linking agent containing a liquid prepared by mixing 0.35 pts.wt. of 1,4-butanediol, 0.55 pts.wt. of propylene glycol, 3.0 pts.wt. of pure water, and 0.1 pts.wt. of sodium persulfate was evenly mixed with 100 pts.wt. of the obtained water absorbing agent (A) as obtained. The resultant mixture was heated at 212° C. for 35 minutes. Then, obtained particles were pulverized so as to pass through a JIS standard sieve having a mesh size of 710 μm. Water absorbent resin particles (1) each having a cross-linked surface were thus obtained. The water absorbent resin particles (1) exhibited a centrifugal retention capacity (CRC) of 27.1 (g/g), a saline flow conductivity (SFC) of 85 ($10^{-7} \cdot cm^3 \cdot s \cdot g^{-1}$), an absorbency against pressure of 4.83 kPa (AAP) of 24.6 (g/g), and a fixed height absorption (FHA) of 23.7 (g/g).

Reference Example 2

In a reactor formed by attaching a cover to a double-arm type stainless kneader having a capacity of 10 liters and equipped with two sigma type blades and a jacket, a reaction liquid was obtained by dissolving 505.6 g of acrylic acid, 4430.8 g of 37 wt % sodium acrylate aqueous solution, 511.7 g of pure water, and 12.786 g of polyethylene glycol diacrylate (molecular weight of 523). Next, the reaction liquid was degassed for 20 minutes under an atmosphere of nitrogen gas. Continuously, 14.67 g of 20 wt % sodium persulfate aqueous solution and 24.45 g of 0.1 wt % L-ascorbic acid aqueous solution were added to the reaction liquid while being stirred, and then polymerization started after approximately 25 seconds. Then, the polymerization was carried out at a temperature in a range of 25° C. to 90° C. while the resultant gel was crushed. A hydrogel cross-linked polymer was taken out 30 minutes after the beginning of the polymerization. The time from when the polymerization started until when the reaction liquid reached the highest temperature was within 15 minutes. The obtained hydrogel (hydrogel cross-linked polymer) was pulverized so as to be not more than approximately 5 mm in diameter.

The pulverized hydrogel cross-linked polymer was spread on a metal net of 50 mesh, and then hot-air dried at 180° C. for 45 minutes. The dried hydrogel was pulverized with a roller mill, and then classified with a JIS standard sieve having a mesh size of 710 μm. Particles passing through the JIS standard sieve were further classified with a JIS standard sieve having a mesh size of 175 μm. Microparticles passing through the JIS standard sieve having a mesh size of 175 μm were excluded, thereby obtaining an irregularly-pulverized water absorbent resin (B) having a mass median particle size (D50) of 343 μm and 0.32 log standard deviation (σξ) of particle-size distribution. The water absorbent resin (B) had a centrifugal retention capacity (CRC) of 33.4 (g/g), and included 6.1 wt % of water-soluble contents and 1.0 wt % of particles having a size with which the particles can pass through a sieve having a mesh size of 150 μm.

A surface-cross-linking agent containing a liquid prepared by mixing 0.34 pts.wt. of 1,4-butanediol, 0.56 pts.wt. of propylene glycol, and 3.0 pts.wt. of pure water was evenly mixed with 100 pts.wt. of the water absorbing agent (B) as obtained. The resultant mixture was heated at 208° C. for 40 minutes. Then, the obtained particles were pulverized so as to pass through a JIS standard sieve having a mesh size of 710 μm. Next, the pulverized particles were applied to a paint shaker test 1. Water absorbent resin particles (2) each having a cross-linked surface were thus obtained. The water absorbent resin particles (2) exhibited a centrifugal retention capacity (CRC) of 29.2 (g/g), a saline flow conductivity (SFC) of 28 ($10^{-7} \cdot cm^3 \cdot s \cdot g^{-1}$), an absorbency against pressure of 4.83 kPa (AAP) of 24.9 (g/g), and a fixed height absorption (FHA) of 25.7 (g/g).

Shown in Table 1 were properties of the water absorbent resin (A) and the water absorbent resin (B) obtained in Reference Examples 1 and 2. Shown in Table 2 were properties of the water absorbent resin particles (1) and the water absorbent resin particles (2).

TABLE 1

|   |   | CENTRIFUGAL RETENTION CAPACITY (CRC) g/g | WATER-SOLUBLE COMPONENT wt % | MASS-MEDIAN PARTICLE SIZE (D50) μm | LOG STANDARD DEVIATION OF PARTICLE-SIZE DISTRIBUTION (σζ) | RATIO OF PARTICLES PASSING THROUGH A SIEVE WITH 150 μm MESH SIZE wt % |
|---|---|---|---|---|---|---|
| REFERENCE EXAMPLE 1 | WATER ABSORBING RESIN (A) | 34.0 | 9.0 | 350 | 0.33 | 1.0 |
| REFERENCE EXAMPLE 2 | WATER ABSORBING RESIN (B) | 33.4 | 6.1 | 343 | 0.32 | 1.0 |
| REFERENCE EXAMPLE 13 | WATER ABSORBING RESIN (C) | 33.1 | 9.9 | 380 | 0.31 | 0.4 |
| EXAMPLE 37 | WATER ABSORBING RESIN (D) | 32.9 | 9.7 | 389 | 0.31 | 0.3 |

TABLE 2

|  |  | CENTRIFUGAL RETENTION CAPACITY (CRC) g/g | SALINE FLOW CONDUCTIVITY (SFC) $(10^{-7} \cdot cm^3 \cdot s \cdot g^{-1})$ | ABSORBENCY AGAINST PRESSURE (AAP) g/g | FIXED HEIGHT ABSORPTION (FHA) g/g |
|---|---|---|---|---|---|
| REFERENCE EXAMPLE 1 | WATER ABSORBENT RESIN PARTICLES (1) | 27.1 | 85 | 24.6 | 23.7 |
| REFERENCE EXAMPLE 2 | WATER ABSORBENT RESIN PARTICLES (2) | 29.2 | 28 | 24.9 | 25.7 |
| REFERENCE EXAMPLE 13 | WATER ABSORBENT RESIN PARTICLES (3) | 29.5 | 52 | 25.7 | 24.0 |

Reference Example 3

Put in a pressure-resistant reactor was 900 g of 50 wt % polyethylenimine aqueous solution (NIPPON SHOKUBAI CO., LTD., EPOMIN® P-1050; EPOMIN® P-1050 is a same polymer as EPOMIN® P-1000 described later, except for its concentration in aqueous solution) and 242.9 g of pure water. Next, atmosphere inside the reactor was replaced with nitrogen, and temperature thereof was warmed up to 80° C. Continuously, 242.9 g of propylene oxide was added to the sealed reactor during 2 hours. During the addition, reaction temperature was maintained at 79° C. to 82° C., and pressure was maintained at 0.8 MPa or below. After propylene oxide was added, the reactant was maintained at 80° C. for 2 hours. As a result, obtained was a modified polyethylenimine (PO-40C) aqueous solution in which 40 mol % of propylene oxide was reacted with respect to all the nitrogen atoms included in polyethylenimine. The modified polyethylenimine (PO-40C) aqueous solution included resin content of 50 wt %. The modified polyethylenimine (PO-40C) aqueous solution was diluted by adding pure water so as to be a 30 wt % aqueous solution. In this way, a modified polyethylenimine (PO-40) aqueous solution was obtained.

A reaction was carried out in the same way as the reaction above by using 900.1 g of 50 wt % polyethylenimine aqueous solution (NIPPON SHOKUBAI CO., LTD., EPOMIN® P-1050), 424.6 g of pure water, and 424 g of propylene oxide. Note that propylene oxide was added during 3.5 hours. As a result, obtained was a modified polyethylenimine (PO-70C) aqueous solution in which 70 mol % of propylene oxide was reacted with respect to all the nitrogen atoms included in polyethyleneimine. The modified polyethylenimine (PO-70C) aqueous solution included resin content of 51.1 wt %, and had a viscosity of 5820 mPa·s (25° C.). The modified polyethylenimine (PO-70C) aqueous solution was diluted by adding pure water so as to be a 30 wt % aqueous solution. In this way, a modified polyethylenimine (PO-70) aqueous solution was obtained.

A reaction was carried out in the same way as the reaction above by using 750.5 g of 50 wt % polyethylenimine aqueous solution (NIPPON SHOKUBAI CO., LTD., EPOMIN® P-1050), 505.8 g of pure water, and 505.8 g of propylene oxide. Note that propylene oxide was added during 4 hours. As a result, obtained was a modified polyethylenimine (PO-100C) aqueous solution in which 100 mol % of propylene oxide was reacted with respect to all the nitrogen atoms included in polyethyleneimine. The modified polyethylenimine (PO-100C) aqueous solution included resin content of 50.8 wt %, and had a viscosity of 3570 mPa·s (25° C.). The modified polyethylenimine (PO-100C) aqueous solution was diluted by adding pure water so as to be a 30 wt % aqueous solution. In this way, a modified polyethylenimine (PO-100) aqueous solution was obtained.

Reference Example 4

In a four-necked glass separable flask equipped with a condenser tube and a stirrer, 300 g of 50 wt % polyethylenimine aqueous solution (NIPPON SHOKUBAI CO., LTD., EPOMIN® P-1050) and 200 g of pure water were added. Next, atmosphere inside the flask was replaced with nitrogen, and temperature thereof was warmed up to 80° C. Continuously, 42 g of styrene oxide was added to the flask during 1 hour. During the addition, reaction temperature was maintained at 80° C. After styrene oxide was added, the reactant was maintained at 80° C. for 7 hours. As a result, obtained was a modified polyethylenimine (SO-10C) aqueous solution in which 10 mol % of styrene oxide was reacted with respect to all the nitrogen atoms included in polyethyleneimine. The modified polyethylenimine (SO-10C) aqueous solution included resin content of 35.8 wt %. The modified polyethylenimine (SO-10C) aqueous solution was diluted by adding pure water so as to be a 30 wt % aqueous solution. In this way, a modified polyethylenimine (SO-10C) aqueous solution was obtained.

A reaction was carried out in the same as the reaction above by using 300 g of 50 wt % polyethylenimine aqueous solution (NIPPON SHOKUBAI CO., LTD., EPOMIN® P-1050), 395 g of pure water, and 83.7 g of styrene oxide. Note that the time for adding styrene oxide was changed to 1.5 hours, and the time used for maintaining the reactant after the addition was changed to 3 hours. In this way, a modified polyethylenimine (SO-20) aqueous solution in which 20 mol % of styrene oxide was reacted with respect to all the nitrogen atoms included in polyethyleneiminewas obtained. The modified polyethylenimine (SO-20) aqueous solution included resin content of 30.0 wt %.

Reference Example 5

In a four-necked glass separable flask equipped with a condenser tube and a stirrer, 79.8 g of 50 wt % polyethylenimine aqueous solution (NIPPON SHOKUBAI CO., LTD., EPOMIN® P-1050) and 716 g of pure water were added. Next, atmosphere inside the flask was replaced with nitrogen. Continuously, 3.98 g of 3-glycydoxypropyltrimethoxysilane (CHISSO CORPORATION, product name: SILA-ACE, product No. S-510) was added to the flask. Then, the resultant mixture was stirred at room temperature for 3 hours. As a result, obtained was a modified polyethylenimine (Si-10) aqueous solution in which 10 mol % of a silane coupling agent was reacted with respect to all the nitrogen atoms included in polyethyleneimine. The modified polyethylenimine aqueous solution (Si-10) included resin content of 5.5 wt %.

Reference Example 6

Added to 10 g of polyethylenimine (number average molecular weight of approximately 70000, NIPPON SHOKUBAI CO., LTD., product name: EPOMIN® P-1000, 30 wt % aqueous solution) was 8.9 g of pure water. The solution was stirred with a stirring bar therein on a stirrer. Into 18.9 g of the obtained solution, 0.91 g of butylglycidylether (SIGMA-ALDRICH Corp.) was dropped, and then the solution was stirred for 1 hour in a hot-water bath of 70° C. to 80° C. In this way, 19.7 wt % polyethylenimine aqueous solution in which 10 mol % of butylglycidylether was reacted with respect to all the nitrogen atoms included in polyethylenimine was obtained. This solution was provided as a modified polyethylenimine (BGE-10) aqueous solution.

Likewise, a modified polyethylenimine (BGE-20) aqueous solution (with a concentration of 19.7 wt %) in which 20 mol % of butylglycidylether was reacted with respect to all the nitrogen atoms included in polyethylenimine was obtained.

Reference Example 7

The following operation was carried out with reference to a method for producing a polymer 1 described in Examples of Japanese Unexamined Patent Publication Tokukai No. 2005-170977.

In a glass separable flask having a capacity of 100 ml and equipped with a reflux condenser, a thermometer, and a stirrer, 45 g of polyethylenimine (NIPPON SHOKUBAI CO., LTD., product name: EPOMIN® SP-200) was added, and then 5.0 g of DENACOL® EX-192 (Nagase ChemteX Corporation) was added while polyethylenimine was stirred. After being warmed up to 60° C. while being stirred, and reacted for 4 hours, the polymer mixture was diluted by adding pure water so that a modified polyethylenimine (EXS-10) aqueous solution (with a concentration of 42.8 wt %) was obtained. The modified polyethylenimine (EXS-10) aqueous solution could be completely dissolved in water at an arbitrary ratio. Further, in an NMR spectral measurement using $D_2O$ as a solvent, a signal indicative of methyn proton generated by opening an epoxy ring was detected at about 3.5 ppm. It was thus determined that the modified polyethylenimine (EXS-10) was produced. In addition, the modified polyethylenimine (EXS-10) aqueous solution did not emit any odor.

Reference Example 8

The following operation was carried out with reference to a method for producing a polymer 1 described in Examples of Japanese Unexamined Patent Publication No. 170977/2005 (Tokukai 2005-170977).

In a glass separable flask having a capacity of 100 ml and equipped with a reflux condenser, a thermometer, and a stirrer, 40 g of polyethylenimine (NIPPON SHOKUBAI CO., LTD., product name: EPOMIN® P-1000, 30 wt % aqueous solution) was added, and then 0.63 g of DENACOL® EX-192 (Nagase ChemteX Corporation) was added while polyethylenimine was stirred. After being warmed up to 60° C. while being stirred, and reacted for 4 hours, the polymer mixture was diluted by adding pure water so that a modified polyethylenimine (EXP-5) aqueous solution (with a concentration of 20 wt %) was obtained. Since a signal indicative of methyn proton generated by opening an epoxy ring was detected at about 3.5 ppm in an NMR spectral measurement using $D_2O$ as a solvent, it was determined that the modified polyethylenimine (EXP-5) was produced. In addition, the modified polyethylenimine (EXP-5) aqueous solution did not emit any odor.

Additionally, an operation was carried out in the same way as above, except that the using amount of DECONAL® EX-192 was changed to 1.33 g. In this way, a modified polyethylenimine (EXP-10) aqueous solution (with a concentration of 20 wt %) was obtained.

Reference Example 9

A solution obtained by evenly mixing 100.0 pts.wt. of polyallylamine FAA®-15B (Nitto Boseki Co., Ltd., 15 wt % aqueous solution) and 50.0 pts.wt. of pure water was provided as a polyallylamine (1) solution (with a concentration of 10 wt %).

Into 40.0 g of the polyallylamine (1) solution, 0.444 g of DENACOL® EX-192 (Nagase ChemteX Corporation) was dropped, and then the solution was stirred at 70° C. for 1 hour. In this way, a modified polyallylamine (EX-10) aqueous solution was obtained.

An operation was carried out in the same way as above, except that the using amount of DENACOL® EX-192 (Nagase ChemteX Corporation) was changed to 1.74 g, so that a modified polyallylamine (EX-30) aqueous solution was obtained.

An operation was carried out in the same way as above, except that the using amount of DENACOL® EX-192 (Nagase ChemteX Corporation) was changed to 4.00 g, so that a modified polyallylamine (EX-50) aqueous solution was obtained.

Reference Example 10

A transparent solution obtained by evenly mixing 100 pts.wt. of EPOMIN® P-1000 (NIPPON SHOKUBAI CO., LTD., 30 wt % aqueous solution) and 200 pts.wt. of pure water was provided as a polyethylenimine (11) aqueous solution (with a concentration of 10 wt %).

In a 90° C. hot-water bath, 40.0 g of the polyethylenimine (11) aqueous solution was warmed, and then 0.444 g of stearic acid (Wako Pure Chemical Industries, Ltd.) heated to 90° C. so as to be melted was added thereto. Then, the mixture was stirred at 90° C. for 1 hour so that a modified polyethylenimine (STE-10) aqueous solution was obtained.

An operation was carried out in the same way as above, except that the using amount of stearic acid was changed to 1.714 g, so that a modified polyethylenimine (STE-30) aqueous solution was obtained.

An operation was carried out in the same way as above, except that the using amount of stearic acid was changed to 4.000 g, so that a modified polyethylenimine (STE-50) aqueous solution was obtained.

Reference Example 11

Mixed were 100 pts.wt. of EPOMIN® P-1000 (NIPPON SHOKUBAI CO., LTD., 30 wt % aqueous solution) and 5.17 pts.wt. of propionic acid (KANTO CHEMICAL CO., INC.). Then, the mixture was stirred at room temperature for 3 hours so that a polyethylenimine (PA-15) aqueous solution was obtained.

An operation was carried out in the same way as above, except that the using amount of propionic acid was changed to 25.8 pts.wt., so that a modified polyethylenimine (PA-46) aqueous solution was obtained.

Reference Example 12

Mixed were 100 pts.wt. of EPOMIN® P-1000 (NIPPON SHOKUBAI CO., LTD., 30 wt % aqueous solution) and 6.98 pts.wt. of lactic acid (KANTO CHEMICAL CO., INC.). Then, the mixture was stirred at room temperature for 3 hours so that a polyethylenimine (LA-17) aqueous solution was obtained.

An operation was carried out in the same way as above, except that the using amount of lactic acid was changed to 34.9 pts.wt., so that a modified polyethylenimine (LA-51) aqueous solution was obtained.

Table 3 is a list of modified cationic polymer compounds, each of which is obtained in Reference Examples 3 through 12, cationic polymer compounds, each of which is a precursor of the modified cationic polymer compounds, and modifying agents.

Reference Example 13

In a reactor formed by attaching a cover to a double-arm type stainless kneader having a capacity of 10 liters and equipped with two sigma type blades and a jacket, a reaction liquid was obtained by dissolving 436.4 g of acrylic acid, 4617.9 g of 37 wt % sodium acrylate aqueous solution, 395.96 g of pure water, 10.13 g (0.08 mol %) of polyethylene glycol diacrylate (average molecular weight is 523), and 0.873 g (0.04 mol %) of 1,4-butanediol. Next, the reaction liquid was degassed for 20 minutes under an atmosphere of nitrogen gas. Continuously, 14.53 g of 20 wt % sodium persulfate aqueous solution and 24.22 g of 1 wt % L-ascorbic acid aqueous solution were added to the reaction liquid while being stirred, and then polymerization started after approximately 34 seconds. Then, the polymerization was carried out at a temperature in a range of 25° C. to 92° C. while the resultant gel was crushed. A hydrogel cross-linked polymer was taken out 30 minutes after the beginning of the polymerization. The obtained hydrogel cross-linked polymer was pulverized so that particles of substantial gel are approximately 5 mm or less in diameter.

The pulverized hydrogel cross-linked polymer was spread on a metal net of 50 mesh, and then hot-air dried at 180° C. for 45 minutes. The dried hydrogel was pulverized with a roller mill, and then classified with a JIS standard sieve having a mesh size of 710 μm. Particles passing through the JIS standard sieve were further classified with a JIS standard sieve having a mesh size of 175 μm. Microparticles passing through the JIS standard sieve having a mesh size of 175 μm were excluded, thereby obtaining an irregularly-pulverized water absorbent resin (C) having a mass median particle size (D50) of 380 μm and 0.31 log standard deviation (σξ) of particle-size distribution. The water absorbent resin (C) had a centrifugal retention capacity (CRC) of 33.1 (g/g), and included 9.9 wt % of water-soluble contents and 0.4 wt % of particles having a size with which the particles can pass through a sieve having a mesh size of 150 μm.

A surface-cross-linking agent composed of a liquid prepared by mixing 0.34 pts.wt. of 1,4-butanediol, 0.56 pts.wt. of propylene glycol, and 3.0 pts.wt. of pure water was evenly mixed with 100 pts.wt. of the water absorbing agent (C) as obtained. The resultant mixture was heated at 208° C. for 40 minutes. Then, obtained particles were pulverized so as to pass through a JIS standard sieve having a mesh size of 710 μm. Next, the pulverized particles were applied to a paint shaker test. Water absorbent resin particles (3) each having a cross-linked surface were thus obtained.

Various properties of the water absorbent resin (C) and the water absorbent resin particles (3) obtained in Reference Example 13 are shown in Table 1 and Table 2, respectively.

Reference Example 14

The same process as in Reference Example 3 was carried out except that the 50 wt % polyethyleneimine aqueous solution was replaced with 1000 g of a polyvinylamine aqueous solution (hereinafter, PVAm95; concentration: 17 mass %, weight average molecular weight: approximately 400,000, hydrolysis ratio: 95 mol %, cationic value 21.4 mmol/g), 205.4 g of pure water, and 42.2 g of propyleneoxide. In this way, a modified polyvinylamine (PO-20) aqueous solution in which 20 mol % of propyleneoxide was reacted with respect to the entire amount of protonatable nitrogen atoms in polyvinyl amine. The modified polyvinylamine (PO-20) aqueous solution had a resin content of 17.0 mass %.

The same process as above was carried out except that 1000 g of a polyvinylamine aqueous solution (hereinafter, PVAm44; concentration: 17 mass %, weight average molecular weight: approximately 400,000, hydrolysis ratio: 44 mol %, cationic value 7.5 mmol/g), 32.7 g of pure water, and 7.3 g of propyleneoxide. In this way, a modified polyvinylamine (PO-10) aqueous solution in which 10 mol % of propyleneoxide was reacted with respect to the entire amount of protonatable nitrogen atoms in polyvinyl amine. The modified polyvinylamine (PO-10) aqueous solution had a resin content of 17.0 mass %.

TABLE 3

| | MODIFIED CATIONIC POLYMER COMPOUND | CATIONIC POLYMER COMPOUND (PRECURSOR) | MODIFYING AGENT |
|---|---|---|---|
| REFERENCE EXAMPLE 3 | MODIFIED POLYETHYLENIMINE (PO-) | POLYETYLENIMINE (EMPONIN P-1000) | PROPYLENE OXIDE |
| REFERENCE EXAMPLE 4 | MODIFIED POLYETHYLENIMINE (SO-) | POLYETYLENIMINE (EMPONIN P-1000) | STYRENE OXIDE |
| REFERENCE EXAMPLE 5 | MODIFIED POLYETHYLENIMINE (Si-) | POLYETYLENIMINE (EMPONIN P-1000) | SILANE COUPLING AGENT |

TABLE 3-continued

| | MODIFIED CATIONIC POLYMER COMPOUND | CATIONIC POLYMER COMPOUND (PRECURSOR) | MODIFYING AGENT |
|---|---|---|---|
| REFERENCE EXAMPLE 6 | MODIFIED POLYETHYLENIMINE (BGE-) | POLYETYLENIMINE (EMPONIN P-1000) | BUTYLGLYCIDYLETHER |
| REFERENCE EXAMPLE 7 | MODIFIED POLYETHYLENIMINE (EXS-) | POLYETYLENIMINE (EPOMIN SP-200) | ALKYLGLYCIDYLETHER (DENACOL EX-192) |
| REFERENCE EXAMPLE 8 | MODIFIED POLYETHYLENIMINE (EXP-) | POLYETYLENIMINE (EMPONIN P-1000) | ALKYLGLYCIDYLETHER (DENACOL EX-192) |
| REFERENCE EXAMPLE 9 | MODIFIED POLYALLYLAMINE (EX-) | POLYALLYLAMINE (PAA15-B) | ALKYLGLYCIDYLETHER (DENACOL EX-192) |
| REFERENCE EXAMPLE 10 | MODIFIED POLYETHYLENIMINE (STE-) | POLYETYLENIMINE (EMPONIN P-1000) | STEARIC ACID |
| REFERENCE EXAMPLE 11 | MODIFIED POLYETHYLENIMINE (PA-) | POLYETYLENIMINE (EMPONIN P-1000) | PROPIONIC ACID |
| REFERENCE EXAMPLE 12 | MODIFIED POLYETHYLENIMINE (LA-) | POLYETYLENIMINE (EMPONIN P-1000) | LACTIC ACID |

Example 1

Added to 100 pts.wt. of water absorbent resin particles (1) obtained in Reference Example 1 was 3.3 pts.wt. of a modified polyethylenimine (PO-40) aqueous solution obtained in Reference Example 3. The addition was carried out while the water absorbent resin particles (1) were stirred so that the modified polyethylenimine (PO-40) aqueous solution was evenly mixed. The obtained mixture was left at rest and no-air dried at 60° C. for 1 hour. The dried mixture was passed through a JIS standard sieve having a mesh size of 850 μm. A water absorbing agent (1) was thus obtained.

Example 2

A water absorbing agent (2) was obtained in the same way as Example 1, except that 13.3 pts.wt. of a modified polyethylenimine (PO-40) aqueous solution obtained in Reference Example 3 was added as an aqueous solution of modified cationic polymer compound.

Example 3

A water absorbing agent (3) was obtained in the same way as Example 1, except that 3.3 pts.wt. of a modified polyethylenimine (PO-70) aqueous solution obtained in Reference Example 3 was added as an aqueous solution of modified cationic polymer compound.

Example 4

A water absorbing agent (4) was obtained in the same way as Example 1, except that 8.7 pts.wt. of a modified polyethylenimine (PO-70) aqueous solution obtained in Reference Example 3 was added as an aqueous solution of modified cationic polymer compound.

Example 5

A water absorbing agent (5) was obtained in the same way as Example 1, except that 1.7 pts.wt. of a modified polyethylenimine (SO-10) aqueous solution obtained in Reference Example 4 was added as an aqueous solution of modified cationic polymer compound.

Example 6

A water absorbing agent (6) was obtained in the same way as Example 1, except that 3.3 pts.wt. of a modified polyethylenimine (SO-10) aqueous solution obtained in Reference Example 4 was added as an aqueous solution of modified cationic polymer compound.

Example 7

A water absorbing agent (7) was obtained in the same way as Example 1, except that 1.7 pts.wt. of a modified polyethylenimine (SO-20) aqueous solution obtained in Reference Example 4 was added as an aqueous solution of modified cationic polymer compound.

Example 8

A water absorbing agent (8) was obtained in the same way as Example 1, except that 3.3 pts.wt. of a modified polyethylenimine (SO-20) aqueous solution obtained in Reference Example 4 was added as an aqueous solution of modified cationic polymer compound.

Example 9

A water absorbing agent (9) was obtained in the same way as Example 1, except that 5.1 pts.wt. of a modified polyethylenimine (BGE-10) aqueous solution obtained in Reference Example 6 was added as an aqueous solution of modified cationic polymer compound.

Example 10

A water absorbing agent (10) was obtained in the same way as Example 1, except that 5.1 pts.wt. of a modified polyethylenimine (BGE-20) aqueous solution obtained in Reference Example 6 was added as an aqueous solution of modified cationic polymer compound.

Example 11

A water absorbing agent (11) was obtained in the same way as Example 1, except that 5.5 pts.wt. of a modified polyethylenimine (Si-10) aqueous solution obtained in Reference Example 5 was added as an aqueous solution of modified cationic polymer compound.

Comparative Example 1

Water absorbent resin particles (1) were provided as a comparative water absorbing agent (1).

Comparative Example 2

Added to 100 pts.wt. of water absorbent resin particles (1) was 3.3 pts.wt. of polyethylenimine (number average molecular weight of 70000, NIPPON SHOKUBAI CO., LTD., product name: EPOMIN® P-1000, 30 wt % aqueous solution). The addition was carried out while the water absorbent resin particles (1) were stirred so that the solution was evenly mixed. The obtained mixture was left at rest and no-air dried at 60° C. for 1 hour. The dried mixture was passed through a JIS standard sieve having a mesh size of 850 μm. A comparative water absorbing agent (2) was thus obtained.

Comparative Example 3

Added to 100 pts.wt. of water absorbent resin particles (1) obtained in Reference Example 1 was 3.3 pts.wt. of a modified polyethylenimine (PO-100) aqueous solution, obtained in Reference Example 3, in which all the amino groups were transformed to tertiary amine by a reaction. The addition was carried out while the water absorbent resin particles (1) were stirred so that the solution was evenly mixed. The obtained mixture was left at rest and no-air dried at 60° C. for 1 hour. The dried mixture was passed through a JIS standard sieve having a mesh size of 850 μm. A comparative water absorbing agent (3) was thus obtained.

Table 4 shows various properties measured in water absorbing agents (1) through (11) obtained in Examples 1 through 11, respectively, and in comparative water absorbing agents (1) through (3) obtained in Comparative Examples 1 through 3, respectively.

TABLE 4

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g | FIXED HEIGHT ABSORPTION (FHA) g/g |
|---|---|---|---|---|---|---|---|---|
| EX. 1 | WATER ABSORBING AGENT (1) | MODIFIED POLYETHYLENIMINE(PO-40) AQUEOUS SOLUTION | 30 | 3.3 | 26.4 | 170 | 22.9 | 21.8 |
| EX. 2 | WATER ABSORBING AGENT (2) | MODIFIED POLYETHYLENIMINE(PO-40) AQUEOUS SOLUTION | 30 | 13.3 | 23.8 | 194 | 20.4 | 19.9 |
| EX. 3 | WATER ABSORBING AGENT (3) | MODIFIED POLYETHYLENIMINE(PO-70) AQUEOUS SOLUTION | 30 | 3.3 | 26.7 | 163 | 23.1 | 22.2 |
| EX. 4 | WATER ABSORBING AGENT (4) | MODIFIED POLYETHYLENIMINE(PO-70) AQUEOUS SOLUTION | 30 | 8.7 | 25.1 | 195 | 22.0 | 21.5 |
| EX. 5 | WATER ABSORBING AGENT (5) | MODIFIED POLYETHYLENIMINE(SO-10) AQUEOUS SOLUTION | 30 | 1.7 | 27.2 | 144 | 22.7 | 15.2 |
| EX. 6 | WATER ABSORBING AGENT (6) | MODIFIED POLYETHYLENIMINE(SO-10) AQUEOUS SOLUTION | 30 | 3.3 | 26.4 | 135 | 21.7 | 14.5 |
| EX. 7 | WATER ABSORBING AGENT (7) | MODIFIED POLYETHYLENIMINE(SO-20) AQUEOUS SOLUTION | 30 | 1.7 | 27.3 | 133 | 22.9 | 14.4 |
| EX. 8 | WATER ABSORBING AGENT (8) | MODIFIED POLYETHYLENIMINE(SO-20) AQUEOUS SOLUTION | 30 | 3.3 | 26.6 | 133 | 21.1 | 11.7 |

TABLE 4-continued

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g | FIXED HEIGHT ABSORPTION (FHA) g/g |
|---|---|---|---|---|---|---|---|---|
| EX. 9 | WATER ABSORBING AGENT (9) | MODIFIED POLYETHYLENIMINE(BGE-10) AQUEOUS SOLUTION | 19.7 | 5.1 | 26.0 | 136 | 21.9 | 18.3 |
| EX. 10 | WATER ABSORBING AGENT (10) | MODIFIED POLYETHYLENIMINE(BGE-20) AQUEOUS SOLUTION | 19.7 | 5.1 | 26.2 | 146 | 22.0 | 11.5 |
| EX. 11 | WATER ABSORBING AGENT (11) | MODIFIED POLYETHYLENIMINE(Si-10) AQUEOUS SOLUTION | 5.5 | 5.5 | 26.4 | 142 | 22.6 | 21.2 |
| COM. EX. 1 | COMPARATIVE WATER ABSORBING AGENT (1) | NO | | | 27.1 | 88 | 24.6 | 23.7 |
| COM. EX. 2 | COMPARATIVE WATER ABSORBING AGENT (2) | POLYETHYLENIMINE (EPOMIN P-1000) AQUEOUS SOLUTION | 30 | 3.3 | 26.5 | 125 | 23.2 | 20.8 |
| COM. EX. 3 | COMPARATIVE WATER ABSORBING AGENT (3) | MODIFIED POLYETHYLENIMINE(PO-100) AQUEOUS SOLUTION | 30 | 3.3 | 26.1 | 127 | 23.3 | 22.6 |

Abbreviation:
EX. stands for EXAMPLE
COM. EX. stands for COMPARATIVE EXAMPLE

As shown in Table 4, each of water absorbing agents (water absorbing agents (1) through (11)) produced by adding modified polyethylenimine exhibited an extremely excellent SFC value. Among them, water absorbing agents (water absorbing agents (1) through (4)) produced by adding polyethylenimine modified with propylene oxide exhibited a particularly excellent SFC value.

A water absorbing agent (comparative water absorbing agent (1)) to which modified polyethylenimine was not added exhibited a poorer SFC value. Also, a water absorbing agent (comparative water absorbing agent (2)) produced by adding polyethylenimine that is not modified (EPOMIN® P-1000: cationic value=23.2 mmol/g, secondary cationic value=11.6 mmol/g) exhibited a poorer SFC value.

Moreover, a water absorbing agent (comparative water absorbing agent (3)) produced by adding polyethylenimine, among the modified polyethylenimine, which is modified to such an extent that all the amino groups are transformed to tertiary amine exhibited a poorer SFC value. This indicates that it is important for the modified polyethylenimine to include primary amine and/or secondary amine.

Example 12

A water absorbing agent (12) was obtained in the same way as Example 1, except that 100 pts.wt. of water absorbent resin particles (2) obtained in Reference Example 2 was used instead of water absorbent resin particles (1).

Example 13

A water absorbing agent (13) was obtained in the same way as Example 1, except that 100 pts.wt. of water absorbent resin particles (2) obtained in Reference Example 2 was used instead of water absorbent resin particles (1), and that 10 pts.wt. of a modified polyethylenimine (PO-40) aqueous solution was added.

Example 14

A water absorbing agent (14) was obtained in the same way as Example 1, except that 100 pts.wt. of water absorbent resin particles (2) obtained in Reference Example 2 was used instead of water absorbent resin particles (1), and that 3.3 pts.wt. of a modified polyethylenimine (PO-70) aqueous solution obtained in Reference Example 3 as an aqueous solution of modified cationic polymer compound was added.

Example 15

A water absorbing agent (15) was obtained in the same way as Example 1, except that 100 pts.wt. of water absorbent resin particles (2) obtained in Reference Example 2 was used instead of water absorbent resin particles (1), and that 10 pts.wt. of a modified polyethylenimine (PO-70) aqueous solution obtained in Reference Example 3 as an aqueous solution of modified cationic polymer compound was added.

Comparative Example 4

Water absorbent resin particles (2) were provided as a comparative water absorbing agent (4).

Comparative Example 5

A comparative water absorbing agent (5) was obtained in the same way as Comparative Example 2, except that 100 pts.wt. of water absorbent resin particles (2) obtained in Reference Example 2 was used instead of water absorbent resin particles (1).

Table 5 shows various properties measured in water absorbing agents (12) through (15) obtained in Examples 12 through 15, respectively, and in comparative water absorbing agents (4) and (5) obtained in Comparative Examples 4 and 5, respectively.

Example 16

A water absorbing agent (16) was obtained in the same way as Example 1, except that 2.3 pts.wt. of a modified polyethylenimine (EXS-10) aqueous solution obtained in Reference Example 7 as an aqueous solution of modified cationic polymer compound.

Example 17

A water absorbing agent (17) was obtained in the same way as Example 1, except that 5.0 pts.wt. of a modified polyethylenimine (EXS-5) aqueous solution obtained in Reference Example 8 as an aqueous solution of modified cationic polymer compound.

TABLE 5

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g | FIXED HEIGHT ABSORPTION (FHA) g/g |
|---|---|---|---|---|---|---|---|---|
| EX. 12 | WATER ABSORBING AGENT (12) | MODIFIED POLYETHYLENIMINE(PO-40) AQUEOUS SOLUTION | 30 | 3.3 | 28.8 | 50 | 23.5 | 23.4 |
| EX. 13 | WATER ABSORBING AGENT (13) | MODIFIED POLYETHYLENIMINE(PO-40) AQUEOUS SOLUTION | 30 | 10 | 26.9 | 81 | 21.6 | 22.1 |
| EX. 14 | WATER ABSORBING AGENT (14) | MODIFIED POLYETHYLENIMINE(PO-70) AQUEOUS SOLUTION | 30 | 3.3 | 28.9 | 53 | 23.5 | 23.7 |
| EX. 15 | WATER ABSORBING AGENT (15) | MODIFIED POLYETHYLENIMINE(PO-70) AQUEOUS SOLUTION | 30 | 10 | 27.0 | 73 | 22.4 | 22.8 |
| COM. EX. 4 | COM. WATER ABSORBING AGENT (4) | NO | | | 29.2 | 28 | 24.9 | 25.7 |
| COM. EX. 5 | COM. WATER ABSORBING AGENT (5) | POLYETHYLENIMINE(EPOMIN P-1000) AQUEOUS SOLUTION | 30 | 3.3 | 28.8 | 44 | 22.1 | 21.9 |

Abbreviation:
EX. stands for EXAMPLE
COM. EX. stands for COMPARATIVE EXAMPLE
COM. WATER ABSORBING AGENT stands for COMPARATIVE WATER ABSORBING AGENT As shown in Table 5, each of water absorbing agents (water absorbing agents (12) through (15)) produced by adding modified polyethylenimine exhibited an extremely excellent SFC value.

A water absorbing agent (comparative water absorbing agent (4)) to which modified polyethylenimine was not added exhibited a poorer SFC value. Also, a water absorbing agent (comparative water absorbing agent (5)) produced by adding polyethylenimine that is not modified (EPOMIN® P-1000: cationic value=23.2 mmol/g, secondary cationic value=11.6 mmol/g) exhibited a poorer SFC value.

Example 18

A water absorbing agent (18μ) was obtained in the same way as Example 1, except that 5.0 pts.wt. of a modified polyethylenimine (EXS-10) aqueous solution obtained in Reference Example 8 as modified cationic polymer compound.

Comparative Example 6

A comparative water absorbing agent (6) was obtained in the same way as Example 1, except that 2.5 pts.wt. of an EPOMIN® SP-200 aqueous solution (with a concentration of 40 wt %) was added to 100 pts.wt. of water absorbent resin particles (1).

Comparative Example 7

A comparative water absorbing agent (7) was obtained in the same way as Example 1, except that 5.0 pts.wt. of an EPOMIN® P-1000 aqueous solution (with a concentration of 20 wt %) was added to 100 pts.wt. of water absorbent resin particles (1).

Table 6 shows various properties measured in water absorbing agents (16) through (18) and in comparative water absorbing agents (1), (6), and (7).

Example 19

A water absorbing agent (19) was obtained in the same way as Example 1, except that 9.1 pts.wt. of a modified polyallylamine (EX-10) aqueous solution obtained in Reference Example 9 as an aqueous solution of modified cationic polymer compound.

Example 20

A water absorbing agent (20) was obtained in the same way as Example 1, except that 7.3 pts.wt. of a modified polyally-

TABLE 6

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g |
|---|---|---|---|---|---|---|---|
| EX. 16 | WATER ABSORBING AGENT (16) | MODIFIED POLYETHYLEN-IMINE(EXS-10) AQUEOUS SOLUTION | 42.8 | 2.3 | 27.2 | 123 | 23.0 |
| EX. 17 | WATER ABSORBING AGENT (17) | MODIFIED POLYETHYLEN-IMINE(EXP-5) AQUEOUS SOLUTION | 20 | 5.0 | 27.0 | 200 | 22.3 |
| EX. 18 | WATER ABSORBING AGENT (18) | MODIFIED POLYETHYLEN-IMINE(EXP-10) AQUEOUS SOLUTION | 20 | 5.0 | 26.9 | 274 | 22.1 |
| COM. EX. 1 | COMPARATIVE WATER ABSORBING AGENT (1) | NO | | | 27.1 | 88 | 24.6 |
| COM. EX. 6 | COMPARATIVE WATER ABSORBING AGENT (6) | POLYETHYLEN-IMINE(SP-200) AQUEOUS SOLUTION | 40 | 2.5 | 27.1 | 102 | 23.2 |
| COM. EX. 7 | COMPARATIVE WATER ABSORBING AGENT (7) | POLYETHYLEN-IMINE(P-1000) AQUEOUS SOLUTION | 20 | 5.0 | 26.5 | 103 | 22.4 |

Abbreviation:
EX. stands for EXAMPLE
COM. EX. stands for COMPARATIVE EXAMPLE

As shown in Table 6, each of water absorbing agents (water absorbing agents (16) through (18)) produced by adding modified polyethylenimine exhibited an extremely excellent SFC value. Among the modified polyethylene used for producing the agents, modified polyethylenimine (used in water absorbing agents (17) and (18)) obtained by modifying polyethylenimine (EPOMIN® P-1000) having a high molecular weight caused a greater effect on SFC.

A water absorbing agent (comparative water absorbing agent (1)) to which modified polyethylenimine was not added exhibited a poorer SFC value. Also, water absorbing agents (comparative water absorbing agents (6) and (7)) produced by adding polyethylenimine that is not modified (EPOMIN® P-1000: cationic value=23.2 mmol/g, secondary cationic value=11.6 mmol/g) (EPOMIN® P-200: cationic value=23.2 mmol/g, secondary cationic value=8.1 mmol/g) exhibited a poorer SFC value.

lamine (EX-30) aqueous solution obtained in Reference Example 9 as an aqueous solution of modified cationic polymer compound.

Example 21

A water absorbing agent (21) was obtained in the same way as Example 1, except that 5.5 pts.wt. of a modified polyallylamine (EX-50) aqueous solution obtained in Reference Example 9 as an aqueous solution of modified cationic polymer compound.

Comparative Example 8

A comparative water absorbing agent (8) was obtained in the same way as Example 1, except that 10 pts.wt. of a polyallylamine (1) aqueous solution (with a concentration of 10 wt %) was added to 100 pts.wt. of water absorbent resin particles (1).

Table 7 shows various properties measured in water absorbing agents (19) through (21) and in comparative water absorbing agents (1) and (8).

TABLE 7

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) $(10^{-7} \cdot cm^3 \cdot s \cdot g^{-1})$ | ABSORBENCY AGAINST PRESSURE (AAP) g/g |
|---|---|---|---|---|---|---|---|
| EX. 19 | WATER ABSORBING AGENT (19) | MODIFIED POLYALLYL-AMINE (EX-10) AQUEOUS SOLUTION | 11.0 | 9.1 | 26.0 | 119 | 20.3 |
| EX. 20 | WATER ABSORBING AGENT (20) | MODIFIED POLYALLYL-AMINE (EX-30) AQUEOUS SOLUTION | 13.7 | 7.3 | 26.3 | 118 | 21.2 |
| EX. 21 | WATER ABSORBING AGENT (21) | MODIFIED POLYALLYL-AMINE (EX-50) AQUEOUS SOLUTION | 18.2 | 5.5 | 26.5 | 129 | 22.2 |
| COM. EX. 1 | COMPARATIVE WATER ABSORBING AGENT (1) | NO | | | 27.1 | 88 | 24.6 |
| COM. EX. 8 | COMPARATIVE WATER ABSORBING AGENT (6) | POLYALLYL-AMINE (PAA-15B) AQUEOUS SOLUTION | 10.0 | 10 | 25.7 | 93 | 19.5 |

Abbreviation:
EX. stands for EXAMPLE
COM. EX. stands for COMPARATIVE EXAMPLE

As shown in Table 7, each of water absorbing agents (water absorbing agents (19) through (21)) produced by adding modified polyallylamine exhibited a extremely excellent SFC value.

A water absorbing agent (comparative water absorbing agent (1)) to which modified polyethylenimine was not added exhibited a poorer SFC value. Also, a water absorbing agent (comparative water absorbing agent (8)) produced by adding polyallylamine that is not modified exhibited a poorer SFC value.

Example 22

A water absorbing agent (22) was obtained in the same way as Example 1, except that 9.1 pts.wt. of a modified polyethylenimine (STE-10)) aqueous solution obtained in Reference Example 10 as an aqueous solution of modified cationic polymer compound.

Example 23

A water absorbing agent (23) was obtained in the same way as Example 1, except that 7.3 pts.wt. of a modified polyethylenimine (STE-30) aqueous solution obtained in Reference Example 10 as an aqueous solution of modified cationic polymer compound.

Example 24

A water absorbing agent (24) was obtained in the same way as Example 1, except that 5.5 pts.wt. of a modified polyethylenimine (STE-50) aqueous solution obtained in Reference Example 10 as an aqueous solution of modified cationic polymer compound.

Comparative Example 9

A comparative water absorbing agent (9) was obtained in the same way as Example 1, except that 10 pts.wt. of a polyethylenimine (11) aqueous solution (with a concentration of 10 wt %) obtained in Reference Example 10 was added to 100 pts.wt. of water absorbent resin particles (1).

Table 8 shows various properties measured in water absorbing agents (22) through (24) and in comparative water absorbing agents (1) and (9).

TABLE 8

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) ($10^{-7} \cdot cm^3 \cdot s^{-1}$) | ABSORBENCY AGAINST PRESSURE (AAP) g/g |
|---|---|---|---|---|---|---|---|
| EX. 22 | WATER ABSORBING AGENT (22) | MODIFIED POLYETHYLENIMINE (STE-10) AQUEOUS SOLUTION | 11.0 | 9.1 | 25.7 | 134 | 21.5 |
| EX. 23 | WATER ABSORBING AGENT (23) | MODIFIED POLYETHYLENIMINE (STE-30) AQUEOUS SOLUTION | 13.7 | 7.3 | 26.2 | 135 | 22.1 |
| EX. 24 | WATER ABSORBING AGENT (24) | MODIFIED POLYETHYLENIMINE (STE-50) AQUEOUS SOLUTION | 18.2 | 5.5 | 26.6 | 150 | 22.5 |
| COM. EX. 1 | COMPARATIVE WATER ABSORBING AGENT (1) | NO | | | 27.1 | 88 | 24.6 |
| COM. EX. 9 | COMPARATIVE WATER ABSORBING AGENT (9) | POLYETHYLENIMINE (EPOMIN P-1000) AQUEOUS SOLUTION | 10 | 10.0 | 26.5 | 103 | 22.4 |

Abbreviation:

EX. stands for EXAMPLE

COM. EX. stands for COMPARATIVE EXAMPLE

As shown in Table 8, each of water absorbing agents (water absorbing agents (22) through (24)) produced by adding modified polyethylenimine exhibited an extremely excellent SFC value.

A water absorbing agent (comparative water absorbing agent (1)) to which modified polyethylenimine was not added exhibited a poorer SFC value. Also, a water absorbing agent (comparative water absorbing agent (9)) produced by adding polyethylenimine that is not modified (EPOMIN® P-1000: cationic value=23.2 mmol/g, secondary cationic value=11.6 mmol/g) exhibited a poorer SFC value.

Example 25

A water absorbing agent (25) was obtained in the same way as Example 1, except that 2.99 pts.wt. of a modified polyethylenimine (PA-15) aqueous solution obtained in Reference Example 11 as an aqueous solution of modified cationic polymer compound.

Example 26

A water absorbing agent (26) was obtained in the same way as Example 1, except that 2.25 pts.wt. of a modified polyethylenimine (PA-46) aqueous solution obtained in Reference Example 11 as an aqueous solution of modified cationic polymer compound.

Table 9 shows various properties measured in water absorbing agents (25) and (26) and in comparative water absorbing agents (1) and (2).

TABLE 9

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g |
|---|---|---|---|---|---|---|---|
| EX. 25 | WATER ABSORBING AGENT (25) | MODIFIED POLYETHYLEN-IMINE (PA-15) AQUEOUS SOLUTION | 33.4 | 2.99 | 26.5 | 154 | 22.1 |
| EX. 26 | WATER ABSORBING AGENT (26) | MODIFIED POLYETHYLEN-IMINE (PA-46) AQUEOUS SOLUTION | 44.4 | 2.25 | 26.4 | 189 | 22.8 |
| COM. EX. 1 | COMPARATIVE WATER ABSORBING AGENT (1) | NO | | | 27.1 | 88 | 24.6 |
| COM. EX. 2 | COMPARATIVE WATER ABSORBING AGENT (2) | POLYETHYLEN-IMINE (EPOMIN P-1000) AQUEOUS SOLUTION | 30 | 3.3 | 26.5 | 125 | 23.2 |

Abbreviation:

EX. stands for EXAMPLE

COM. EX. stands for COMPARATIVE EXAMPLE

Example 27

A water absorbing agent (27) was obtained in the same way as Example 1, except that 2.95 pts.wt. of a modified polyethylenimine (LA-17) aqueous solution obtained in Reference Example 12 as an aqueous solution of modified cationic polymer compound.

Example 28

A water absorbing agent (28) was obtained in the same way as Example 1, except that 2.20 pts.wt. of a modified polyethylenimine (LA-51) aqueous solution obtained in Reference Example 12 as an aqueous solution of modified cationic polymer compound.

Table 10 shows various properties measured in water absorbing agents (27) and (28) and in comparative water absorbing agents (1) and (2).

TABLE 10

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) $(10^{-7} \cdot cm^3 \cdot s \cdot g^{-1})$ | ABSORBENCY AGAINST PRESSURE (AAP) g/g |
|---|---|---|---|---|---|---|---|
| EX. 27 | WATER ABSORBING AGENT (27) | MODIFIED POLYETHYLENIMINE (LA-17) AQUEOUS SOLUTION | 33.9 | 2.95 | 26.6 | 144 | 22.3 |
| EX. 28 | WATER ABSORBING AGENT (28) | MODIFIED POLYETHYLENIMINE (LA-51) AQUEOUS SOLUTION | 45.5 | 2.2 | 26.7 | 162 | 23.1 |
| COM. EX. 1 | COMPARATIVE WATER ABSORBING AGENT (1) | NO | | | 27.1 | 88 | 24.6 |
| COM. EX. 2 | COMPARATIVE WATER ABSORBING AGENT (2) | POLYETHYLENIMINE (EPOMIN P-1000) AQUEOUS SOLUTION | 30 | 3.3 | 26.5 | 125 | 23.2 |

Abbreviation:
EX. stands for EXAMPLE
COM. EX. stands for COMPARATIVE EXAMPLE

As shown in Tables 9 and 10, each of water absorbing agents (water absorbing agents (25) through (28)) produced by adding modified polyethylenimine exhibited an extremely excellent SFC value.

A water absorbing agent (comparative water absorbing agent (1)) to which modified polyethylenimine was absorbing agent (1)) to which modified polyethylenimine was not added exhibited a poorer SFC value. Also, a water absorbing agent (comparative water absorbing agent (2)) produced by adding polyethylenimine that is not modified (EPOMIN® P-1000: cationic value=23.2 mmol/g, secondary cationic value=11.6 mmol/g) exhibited a poorer SFC value.

Example 29

A water absorbing agent (29) was obtained in the same way as Example 1, except that 100 pts.wt. of water absorbent resin particles (3) obtained in Reference Example 13 was used instead of water absorbent resin particles (1), and that 2.0 pts.wt. of a modified polyethylenimine (PO-40C) aqueous solution was added.

Example 30

A water absorbing agent (30) was obtained in the same way as Example 1, except that 100 pts.wt. of water absorbent resin particles (3) obtained in Reference Example 13 was used instead of water absorbent resin particles (1), and that 4.0 pts.wt. of a modified polyethylenimine (PO-40C) aqueous solution was added.

Example 31

A water absorbing agent (31) was obtained in the same way as Example 1, except that 100 pts.wt. of water absorbent resin particles (3) obtained in Reference Example 13 was used instead of water absorbent resin particles (1), and that 6.0 pts.wt. of a modified polyethylenimine (PO-40C) aqueous solution was added.

Example 32

A water absorbing agent (32) was obtained in the same way as Example 1, except that 100 pts.wt. of water absorbent resin particles (3) obtained in Reference Example 13 was used instead of water absorbent resin particles (1), and that 8.0 pts.wt. of a modified polyethylenimine (PO-40C) aqueous solution was added.

Comparative Example 10

Water absorbent resin particles (3) were provided as a comparative water absorbing agent (10).

Examples 33 Through 36

Added to 100 pts.wt. of water absorbing agent (29) obtained in Example 29 was 0.3 pts.wt. of hydrophilic amorphous silica (NIPPON AEROSIL CO., LTD., product name: AEROSIL®200). The resultant mixture was evenly mixed, thereby obtaining a water absorbing agent (33). Water absorbing agents (30) through (32) were applied to the same operation as above, thereby obtaining water absorbing agents (34) through (36), respectively. In comparison with the water absorbing agents (29) through (32), the water absorbing agents (33) through (36) had an advantage in handling of particles. In particular, flowability of the particles was dramatically improved.

Table 11 shows various properties measured in water absorbing agents (29) through (36) obtained in Examples 29 through 36, respectively, and in comparative water absorbing agent (10) obtained in Comparative Example 10.

TABLE 11

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g |
|---|---|---|---|---|---|---|---|
| EX. 29 | WATER ABSORBING AGENT (29) | MODIFIED POLYETHYLEN-IMINE (PO-40C) AQUEOUS SOLUTION | 50.0 | 2.0 | 29.3 | 204 | 24.3 |
| EX. 30 | WATER ABSORBING AGENT (30) | MODIFIED POLYETHYLEN-IMINE (PO-40C) AQUEOUS SOLUTION | 50.0 | 4.0 | 28.5 | 169 | 23.1 |
| EX. 31 | WATER ABSORBING AGENT (31) | MODIFIED POLYETHYLEN-IMINE (PO-40C) AQUEOUS SOLUTION | 50.0 | 6.0 | 28.1 | 174 | 22.7 |
| EX. 32 | WATER ABSORBING AGENT (32) | MODIFIED POLYETHYLEN-IMINE (PO-40C) AQUEOUS SOLUTION | 50.0 | 8.0 | 27.4 | 188 | 22.5 |
| EX. 33 | WATER ABSORBING AGENT (33) | MODIFIED POLYETHYLEN-IMINE (PO-40C) AQUEOUS SOLUTION + HYDROPHILIC AMORPHOUS SILICA | 50.0 | 2.0 | 29.5 | 134 | 23.7 |
| EX. 34 | WATER ABSORBING AGENT (34) | MODIFIED POLYETHYLEN-IMINE (PO-40C) AQUEOUS SOLUTION + HYDROPHILIC AMORPHOUS SILICA | 50.0 | 4.0 | 28.7 | 106 | 22.6 |
| EX. 35 | WATER ABSORBING AGENT (35) | MODIFIED POLYETHYLEN-IMINE (PO-40C) AQUEOUS SOLUTION + HYDROPHILIC AMORPHOUS SILICA | 50.0 | 6.0 | 28.0 | 120 | 21.7 |
| EX. 36 | WATER ABSORBING AGENT (36) | MODIFIED POLYETHYLEN-IMINE (PO-40C) AQUEOUS SOLUTION + HYDROPHILIC AMORPHOUS SILICA | 50.0 | 8.0 | 27.5 | 130 | 20.4 |
| EX. 38 | WATER ABSORBING AGENT (39) | MODIFIED POLYVINYL-AMINE (PO-20) AQUEOUS SOLUTION | 17.0 | 2.94 | 29.0 | 110 | 20.1 |
| EX. 39 | WATER ABSORBING AGENT (40) | MODIFIED POLYVINYL-AMINE (PO-10) | 17.0 | 2.94 | 29.0 | 115 | 20.8 |

TABLE 11-continued

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) $(10^{-7} \cdot cm^3 \cdot s \cdot g^{-1})$ | ABSORBENCY AGAINST PRESSURE (AAP) g/g |
|---|---|---|---|---|---|---|---|
| COM. EX. 10 | COMPARATIVE WATER ABSORBING AGENT (10) | AQUEOUS SOLUTION NO | | | 29.5 | 52 | 25.7 |

Abbreviation:
EX. stands for EXAMPLE
COM. EX. stands for COMPARATIVE EXAMPLE

Example 37

In a reactor formed by attaching a cover to a double-arm type stainless kneader having a capacity of 10 liters and equipped with two sigma type blades and a jacket, a reaction liquid was obtained by dissolving 436.4 g of acrylic acid, 4617.9 g of 37 wt % sodium acrylate aqueous solution, 395.96 g of pure water, 10.13 g (0.08 mol %) of polyethylene glycol diacrylate (molecular weight is 523; in regard to the polyethylene glycol diacrylate, which is used as an internal cross-linking agent, the average number (n) of moles of added ethylene oxide is 9), and 0.873 g (0.04 mol %) of 1,4-butanediol. Next, the reaction liquid was degassed for 20 minutes under an atmosphere of nitrogen gas while being maintained at 25° C. Oxygen dissolved in the system was 1 wtppm or less. Continuously, 14.53 g of 20 wt % sodium persulfate aqueous solution and 24.22 g of 1 wt % L-ascorbic acid aqueous solution were added to the reaction liquid while being stirred. The reaction solution reached 25.5° C. after approximately 34 seconds, and then polymerization started. Added to the system 3 minutes after the beginning of the polymerization was 21.55 g (200 wtppm of total monomer mass) of 2 wt % ethylene diamine tetra (methylene phosphonic acid) pentasodium salt (abbreviation: EDTMP.5Na). Then, the polymerization was carried out at a temperature in a range of 25.5° C. to 92° C. while the resultant gel was crushed. A hydrogel cross-linked polymer was taken out 30 minutes after the beginning of the polymerization. The obtained hydrogel cross-linked polymer was pulverized so that particles of substantial gel are approximately 5 mm or less in diameter.

The pulverized hydrogel cross-linked polymer was spread on a metal net of 50 mesh, and then hot-air dried at 180° C. for 45 minutes. The dried hydrogel was pulverized with a roller mill, and then classified with a JIS standard sieve having a mesh size of 710 μm. Particles passing through the JIS standard sieve were further classified with a JIS standard sieve having a mesh size of 175 μm. Microparticles passing through the JIS standard sieve having a mesh size of 175 μm were excluded, thereby obtaining an irregularly-pulverized water absorbent resin (D) having a mass median particle size (D50) of 389 μm and 0.31 log standard deviation (σξ) of particle-size distribution. The water absorbent resin (D) had a centrifugal retention capacity (CRC) of 32.9 (g/g), and included 9.7 wt % of water-soluble contents and 0.3 wt % of particles having a size with which the particles can pass through a sieve having a mesh size of 150 μm.

A surface-cross-linking agent composed of a liquid prepared by mixing 0.34 pts.wt. of 1,4-butanediol, 0.56 pts.wt. of propylene glycol, and 3.0 pts.wt. of pure water was evenly mixed with 100 pts.wt. of the water absorbing resin (D) as obtained. The resultant mixture was heated at 209° C. for 30 minutes. Then, obtained particles were pulverized so as to pass through a JIS standard sieve having a mesh size of 710 μm. Water absorbent resin particles (4-30) each having a cross-linked surface were thus obtained.

Water absorbent resin particles (4-35) each having a cross-linked surface was obtained in the same way as above, except that the time for heating the mixture was changed to 35 minutes.

Water absorbent resin particles (4-40) each having a cross-linked surface was obtained in the same way as above, except that the time for heating the mixture was changed to 40 minutes.

Water absorbent resin particles (4-45) each having a cross-linked surface was obtained in the same way as above, except that the time for heating the mixture was changed to 45 minutes.

Next, each of the water absorbent resin particles was applied to a paint shaker test 1. As a result, water absorbent resin particles (5-30), (5-35), (5-40), and (5-45) were obtained from the water resin particles (4-30), (4-35), (4-40), and (4-45), respectively.

Various properties of the water absorbent resin (D) as obtained are shown in Table 1. Various properties of the water absorbent resin particles (4-30), (4-35), (4-40), (4-45), (5-30), (5-35), (5-40), and (5-45) are shown in Table 12.

Added to 100 pts.wt. of the water absorbent resin particles (5-40) was a solution (modified polyethylenimine (PO-40C) aqueous/methanol solution) obtained by mixing 2.0 pts.wt. of modified polyethylenimine (PO-40C) and 2.0 pts.wt. of methanol. The addition was carried out while the water absorbent resin particles (5-40) were stirred so that the solution was evenly mixed. The mixture was left at rest and no-air dried at 90° C. for 1 hour. Then, the dried mixture was passed through a JIS standard sieve having a mesh size of 850 μm. A water absorbing agent (37) was thus obtained.

A water absorbing agent (38) was obtained in the same as above by using a solution (modified polyethylenimine (PO-70C) aqueous/methanol solution) obtained by mixing 2.0 pts.wt. of modified polyethylenimine (PO-70C) and 2.0 pts.wt. of methanol.

The water absorbent resin particles (5-40) were provided as a comparative water absorbing agent (11).

Table 13 shows various properties measured in the water absorbing agents (37) and (38) and in the comparative water absorbing agent (11). Table 14 shows coloration measured (by using Hunter Lab color scale/L-value, a-value, b-value) in the water absorbing agent (38).

TABLE 12

|  |  | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g | FIXED HEIGHT ABSORPTION (FHA) g/g |
|---|---|---|---|---|---|
| EX. 37 | WATER ABSORBENT RESIN PARTICLES (4-30) | 30.5 | 42 | 26.0 | 25.7 |
| EX. 37 | WATER ABSORBENT RESIN PARTICLES (4-35) | 29.9 | 62 | 25.8 | 25.2 |
| EX. 37 | WATER ABSORBENT RESIN PARTICLES (4-40) | 29.2 | 84 | 25.6 | 24.3 |
| EX. 37 | WATER ABSORBENT RESIN PARTICLES (4-45) | 28.2 | 97 | 24.8 | 24.2 |
| EX. 37 | WATER ABSORBENT RESIN PARTICLES (5-30) | 30.5 | 27 | 26.1 | 25.9 |
| EX. 37 | WATER ABSORBENT RESIN PARTICLES (5-35) | 29.9 | 32 | 25.8 | 25.3 |
| EX. 37 | WATER ABSORBENT RESIN PARTICLES (5-40) | 29.2 | 55 | 25.3 | 24.5 |
| EX. 37 | WATER ABSORBENT RESIN PARTICLES (5-45) | 28.2 | 68 | 24.6 | 24.3 |

Abbreviation:
EX. stands for EXAMPLE

TABLE 13

| EX. | WATER ABSORBING AGENT | ADDITIVE AGENT | AQUEOUS SOLUTION CONCENTRATION OF ADDITIVE AGENT wt % | ADDITIVE AMOUNT (AMOUNT OF SOLUTION) wt % | CENTRIFUGAL RETENTION CAPACITY (CRC) g/g | SALINE FLOW CONDUCTIVITY (SFC) ($10^{-7} \cdot cm^3 \cdot s \cdot g^{-1}$) | ABSORBENCY AGAINST PRESSURE (AAP) g/g | FIXED HEIGHT ABSORPTION (FHA) g/g |
|---|---|---|---|---|---|---|---|---|
| EX. 37 | WATER ABSORBING AGENT (37) | MODIFIED POLYETHYLENIMINE (PO-40C) AQUEOUS/METHANOL SOLUTION | 25.0 | 4.0 | 29.0 | 120 | 24.4 | 23.8 |
| EX. 37 | WATER ABSORBING AGENT (38) | MODIFIED POLYETHYLENIMINE (PO-70C) AQUEOUS/METHANOL SOLUTION | 25.0 | 4.0 | 29.0 | 121 | 24.5 | 23.9 |
| EX. 37 | COMPARATIVE WATER ABSORBING AGENT (11) | NO |  |  | 29.2 | 55 | 25.3 | 24.5 |

Abbreviation:
EX. stands for EXAMPLE

TABLE 14

| EXAMPLE | WATER ABSORBING AGENT | ADDITIVE AGENT | L-VALUE, a-VALUE, AND b-VALUE BEFORE BEING EXPOSED | | |
|---|---|---|---|---|---|
| | | | L-VALUE | a-VALUE | b-VALUE |
| EXAMPLE 37 | WATER ABSORBING AGENT (38) | MODIFIED POLYETHYLENIMINE (PO-70 C) AQUEOUS/METHANOL SOLUTION | 89.2 | −0.2 | 7.8 |

L-VALUE, a-VALUE, AND b-VALUE 7 DAYS AFTER BEING EXPOSED TO ATMOSPHERE WITH

TABLE 14-continued

| EXAMPLE | WATER ABSORBING AGENT | TEMPERATURE OF 70 ± 1° C. AND RELATIVE HUMIDITY OF 65 ± 1% | | |
|---|---|---|---|---|
| | | L-VALUE | a-VALUE | b-VALUE |
| EXAMPLE 37 | WATER ABSORBING AGENT (38) | 84.0 | 0.1 | 10.9 |

Example 38

A water absorbing agent (39) was obtained in the same way as Example 1, except that 100 pts.wt. of water absorbent resin particles (3) obtained in Reference Example 13 was used instead of water absorbent resin particles (1), and that 2.94 pts.wt. of the modified polyvinylamine (PO-20) aqueous solution obtained in Reference Example 14 was added. The properties of the water absorbing agent (39) are shown on Table 11.

Example 39

A water absorbing agent (40) was obtained in the same way as Example 1, except that 100 pts.wt. of water absorbent resin particles (3) obtained in Reference Example 13 was used instead of water absorbent resin particles (1), and that 2.94 pts.wt. of the modified polyvinylamine (PO-10) aqueous solution obtained in Reference Example 14 was added. The properties of the water absorbing agent (40) are shown on Table 11.

TABLE 15

| REFERENCE EXAMPLES. | | CATIONIC VALUE mmol/g | SECONDARY CATIONIC VALUE mmol/g |
|---|---|---|---|
| | POLYETHYLENEIMINE (EPOMIN P-1050, P-1000) | 23.2 | 11.6 |
| 3 | MODIFIED POLYETHYLENEIMINE (PO-40) | 15.1 | 9.1 |
| 3 | MODIFIED POLYETHYLENEIMINE (PO-70) | 12.0 | 3.6 |
| 3 | MODIFIED POLYETHYLENEIMINE (PO-100) | 9.9 | 0 |
| 4 | MODIFIED POLYETHYLENEIMINE (SO-10) | 18.2 | 10.9 |
| 4 | MODIFIED POLYETHYLENEIMINE (SO-20) | 14.9 | 10.4 |
| 5 | MODIFIED POLYETHYLENEIMINE (Si-10) | 15.8 | 9.5 |
| 6 | MODIFIED POLYETHYLENEIMINE (BGE-10) | 17.8 | 10.7 |
| 6 | MODIFIED POLYETHYLENEIMINE (BGE-20) | 14.5 | 10.1 |
| | POLYETHYLENEIMINE (EPOMIN SP-200) | 23.2 | 8.1 |
| 7 | MODIFIED POLYETHYLENEIMINE (EXP-10) | 14.6 | 8.7 |
| 8 | MODIFIED POLYETHYLENEIMINE (EXP-5) | 17.9 | 9.8 |
| 8 | MODIFIED POLYETHYLENEIMINE (EXP-10) | 14.6 | 8.7 |
| | POLYALLYLAMINE (PAA-15B) | 17.5 | 0 |
| 9 | MODIFIED POLYALLYLAMINE (EX-10) | 12.1 | 1.2 |
| 9 | MODIFIED POLYALLYLAMINE (EX-30) | 7.5 | 2.2 |
| 9 | MODIFIED POLYALLYLAMINE (EX-50) | 5.4 | 2.7 |
| 10 | MODIFIED POLYETHYLENIMINE (STE-10) | 14.0 | 7.0 |
| 10 | MODIFIED POLYETHYLENIMINE (STE-30) | 7.8 | 3.9 |
| 10 | MODIFIED POLYETHYLENIMINE (STE-50) | 5.4 | 2.7 |
| 11 | MODIFIED POLYETHYLENIMINE (PA-15) | 18.6 | 9.3 |
| 11 | MODIFIED POLYETHYLENIMINE (PA-46) | 13.1 | 6.6 |
| 12 | MODIFIED POLYETHYLENIMINE (LA-17) | 17.2 | 8.6 |
| 12 | MODIFIED POLYETHYLENIMINE (LA-51) | 11.4 | 5.7 |
| | POLYVINYLAMINE (PVAm95) | 21.4 | 0 |
| 14 | MODIFIED POLYVINYLAMINE (PO-20) | 17.1 | 3.4 |
| | POLYVINYLAMINE (PVAm44) | 7.5 | 0 |
| 14 | MODIFIED POLYVINYLAMINE (PO-10) | 7.2 | 0.7 |

Table 15 shows cationic value and secondary cationic values of the cationic polymer compound and the modified cationic polymer compound used in Examples.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A water absorbing agent according to the present invention, and a water absorbing agent obtained by a method according to the present invention for producing the water absorbing agent are excellent in balance between liquid permeability under load and absorption capacity. Thus, they can be used for water absorbing or moisture holding agents for various uses.

For example, the water absorbing agent are applicable to: water absorbing or moisture holding agents for disposable diapers, sanitary napkins, incontinent pads, medical pads, and the like; agricultural/horticultural water retaining agents such as replacement of bog moss, soil conditioner, water retaining agent; agricultural chemical effect sustaining agents; construction water retaining agent such as anti-dew agent for interior walls, cement additive; release controller; cold insulator; disposable body warmer; sludge coagulator; food freshness keeping materials; ion exchange column materials; dehydrating agent for sludge or oil; drying agents, moisture adjusting materials; and the like.

Moreover, the water absorbing agent according to the present invention is especially suitable for use in sanitary materials for absorbing feces, urine, or blood, such as disposable diaper, sanitary napkins, and the like.

The invention claimed is:

1. A water absorbing agent comprising:
    water absorbent resin particles, the surface of the water absorbent resin particles is cross-linked by a polyalcohol surface cross-linking agent; and
    a modified cationic polymer compound containing a secondary amino group, said modified cationic polymer being obtained by reacting a cationic polymer compound containing the secondary amino group with a modifying agent, wherein all of the secondary amino groups of the cationic polymer compound do not react with the modifying agent, and some of the secondary amino groups still remain unreacted with the modifying agent,
    the cationic polymer compound having a cationic value of from 1 to 22 mmol/g, and a secondary cationic value of from 0.1 to 11 mmol/g.

2. The water absorbing agent as set forth in claim 1, wherein the modified cationic polymer compound exists on a surface of each of the water absorbent resin particles.

3. The water absorbing agent as set forth in claim 1, wherein a weight average molecular weight of the modified cationic polymer compound is 5000 or more.

4. The water absorbing agent as set forth in claim 1, further comprising a water-soluble polyvalent metal salt and/or water-insoluble inorganic fine particles.

* * * * *